US006981644B2

(12) United States Patent
Cheong et al.

(10) Patent No.: US 6,981,644 B2
(45) Date of Patent: Jan. 3, 2006

(54) APPARATUS AND METHOD FOR RECOGNIZING CODE

(75) Inventors: Cheol Ho Cheong, Seoul (KR); Nam Kyu Lee, Goyang (KR); Tack Don Han, Seoul (KR)

(73) Assignee: Colorzip Media, Inc., Seoul (KR)

( * ) Notice: Subject to any disclaimer, the term of this patent is extended or adjusted under 35 U.S.C. 154(b) by 16 days.

(21) Appl. No.: 10/492,305

(22) PCT Filed: May 13, 2002

(86) PCT No.: PCT/KR02/00886

§ 371 (c)(1),
(2), (4) Date: Apr. 12, 2004

(87) PCT Pub. No.: WO03/041014

PCT Pub. Date: May 15, 2003

(65) Prior Publication Data

US 2005/0001033 A1    Jan. 6, 2005

(30) Foreign Application Priority Data

Nov. 3, 2001 (KR) ............................. 2001-68378

(51) Int. Cl.
*G06K 7/10*  (2006.01)
(52) U.S. Cl. ..................... 235/462.04; 235/462.01; 235/462.02
(58) Field of Classification Search ................. 235/462.01–462.49

See application file for complete search history.

(56) References Cited

U.S. PATENT DOCUMENTS

| 3,894,217 A | * | 7/1975 | Ebukuro et al. ............ 235/469 |
| 5,352,878 A |   | 10/1994 | Smith et al. |
| 5,992,748 A | * | 11/1999 | Takahashi et al. ...... 235/462.04 |
| 6,081,739 A | * | 6/2000 | Lemchen .................... 600/407 |
| 6,785,026 B1 | * | 8/2004 | Terajima et al. ............ 358/509 |
| 2002/0015536 A1 | * | 2/2002 | Warren et al. .............. 382/284 |
| 2003/0189736 A1 | * | 10/2003 | Ikeda ......................... 358/475 |

FOREIGN PATENT DOCUMENTS

| EP | 0 582 911 A  | 2/1994 |
| EP | 0 582 911 A2 | 2/1994 |
| EP | 0 582 911 A3 | 2/1994 |

* cited by examiner

*Primary Examiner*—Thien M. Le
*Assistant Examiner*—Kimberly D. Nguyen
(74) *Attorney, Agent, or Firm*—Frank P. Presta; Nixon & Vanderhye, PC

(57) ABSTRACT

An apparatus and method for recognizing a code from a code image that is expressed physically or electronically and extracting data represented in the code image is provided. The method includes the steps of receiving a raw image in which a code image is contained, detecting a background image included in the raw image, extracting a code image region in which a background image is excluded, recognizing the shape and type of the code image and the color or shade represented in each of cells, converting the color or shade recognized from each of the cells into a corresponding character, number, or symbol and generating code data. The code image in which predetermined data are represented as colors or shades are received, and original colors or shades can be precisely discriminated regardless of an environment in which the code image is recognized.

15 Claims, 18 Drawing Sheets

| COLORS | CODE VALUES (BINARY) |
|--------|----------------------|
| YELLOW | 00 |
| GREEN  | 01 |
| RED    | 10 |
| BLACK  | 11 |

FIG. 3B

| | Number & Special Characters | | | Alphabet (Upprt-case letter) | | | Alphabet (Lower-case letter) | | |
|---|---|---|---|---|---|---|---|---|---|
| | char | color | code | char | color | code | char | color | code |
| 1 | 0 | | 000 000 | A | | 001 011 | a | | 100 101 |
| 2 | 1 | | 000 001 | B | | 001 100 | b | | 100 110 |
| 3 | 2 | | 000 010 | C | | 001 101 | c | | 100 111 |
| 4 | 3 | | 000 011 | D | | 001 110 | d | | 101 000 |
| 5 | 4 | | 000 100 | E | | 001 111 | e | | 101 001 |
| 6 | 5 | | 000 101 | F | | 010 000 | f | | 101 010 |
| 7 | 6 | | 000 110 | G | | 010 001 | g | | 101 011 |
| 8 | 7 | | 000 111 | H | | 010 010 | h | | 101 100 |
| 9 | 8 | | 001 000 | I | | 010 011 | i | | 101 101 |
| 10 | 9 | | 001 001 | J | | 010 100 | j | | 101 110 |
| 11 | Space | | 001 010 | K | | 010 101 | k | | 101 111 |
| 12 | Toggle | | 111 111 | L | | 010 110 | l | | 110 000 |
| 13 | | | | M | | 010 111 | m | | 110 001 |
| 14 | | | | N | | 011 000 | n | | 110 010 |
| 15 | | | | O | | 011 001 | o | | 110 011 |
| 16 | | | | P | | 011 010 | p | | 110 100 |
| 17 | | | 100 | Q | | 011 011 | q | | 110 101 |
| 18 | RED | | 010 | R | | 011 100 | r | | 110 110 |
| 19 | GREEN | | 001 | S | | 011 101 | s | | 110 111 |
| 20 | BLUE | | 110 | T | | 011 110 | t | | 111 000 |
| 21 | YELLOW | | 101 | U | | 011 111 | u | | 111 001 |
| 22 | MAGENTA | | 011 | V | | 100 000 | v | | 111 010 |
| 23 | CYAN | | 111 | W | | 100 001 | w | | 111 011 |
| 24 | WHITE | | 000 | X | | 100 010 | x | | 111 100 |
| 25 | BLACK | | | Y | | 100 011 | y | | 111 101 |
| 26 | | | | Z | | 100 100 | z | | 111 110 |

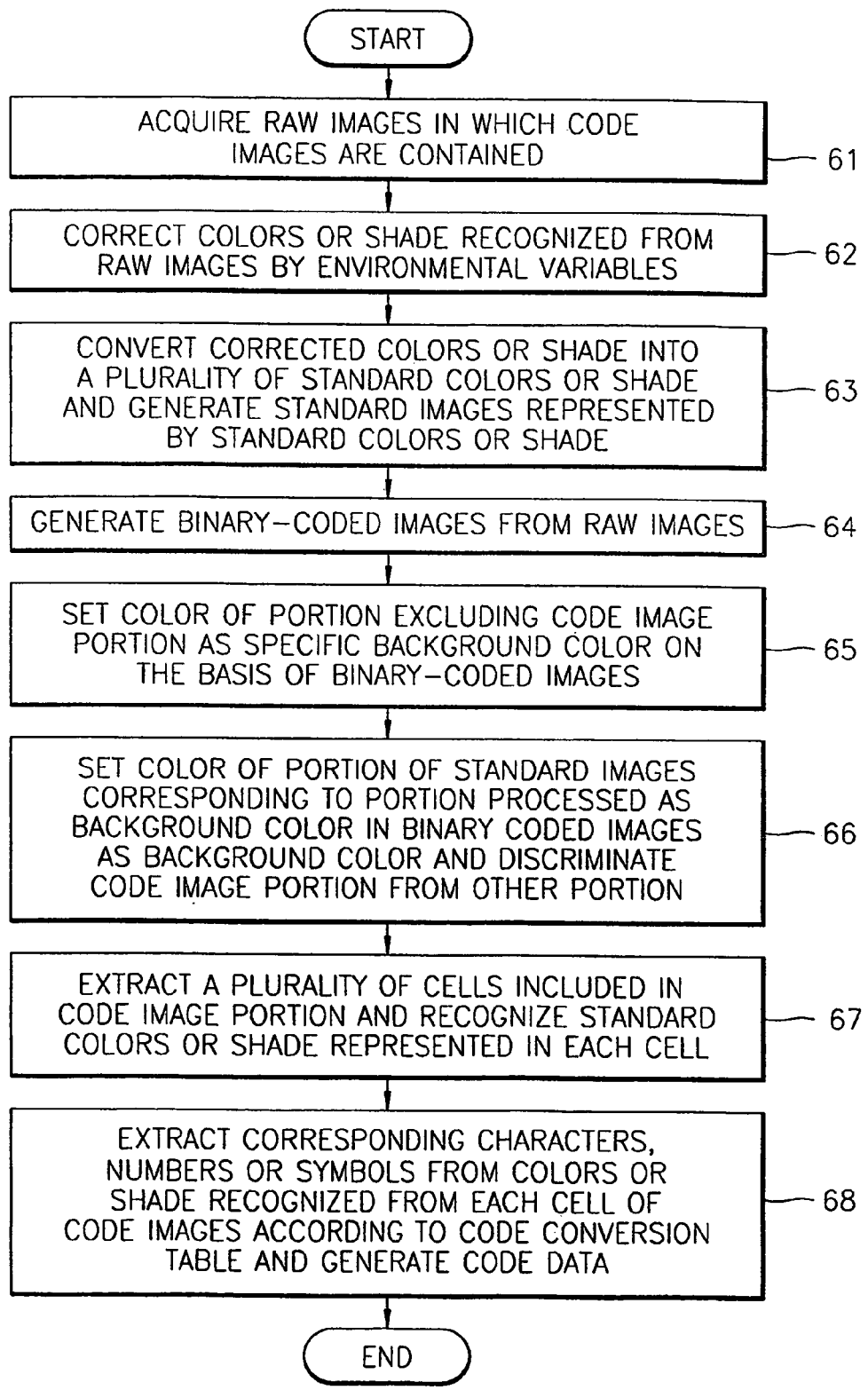

APPARATUS AND METHOD FOR RECOGNIZING CODE

This application is the US national phase of international application PCT/KR02/00886 filed in English on 13 May 2002, which designated the US. PCT/KR02/00886 claims priority to KR Application No. 2001-0068378 filed 03 Nov. 2001. The entire contents of these applications are incorporated herein by reference.

TECHNICAL FIELD

The present invention relates to an apparatus for recognizing a code image, which is physically or electronically expressed, and for extracting information represented on the code image, and a method therefor.

BACKGROUND ART

In a method for representing recognizable data, such as characters, numbers, or symbols, there is a case where characters, numbers, or symbols are represented as images in consideration of security of data or a display space. Likewise, in order to read an original data from a code image in which data is represented as an image, a suitable decoder must be provided.

DISCLOSURE OF THE INVENTION

To solve the above problem, it is an object of the present invention to provide an apparatus for recognizing a code which is capable of reading an original data from a code image in which data is expressed as a color or shade, and a method therefor.

Accordingly, to achieve the above object, according to one aspect of the present invention, there is provided an apparatus for recognizing a code. The apparatus includes an image-acquiring portion for acquiring a raw image in which a code image is contained, a color-converting portion for correcting colors or shades recognized in the raw image, using environmental variables, converting the corrected colors or shades into a plurality of standard colors or standard shades used to generate the code image, and generating a standard image represented by the standard colors or standard shades, a binary-coding converting portion for dividing the colors or shades of the raw image into two colors according to a predetermined reference value and generating a binary-coded image, an image-processing portion for extracting an area excluding a code image area from the binary-coded image, setting a color of the area corresponding to the extracted area in the standard image as a background color, thereby discriminating the code image area from other areas, extracting a plurality of cells included in the code image area, and recognizing the standard color or standard shade represented in each of the cells, and a code-converting portion for extracting a corresponding character, number, or symbol from the color or shade recognized in each of the cells of the code image according to a relationship between a character, number, or symbol and a corresponding color or shade and generating code data.

To achieve the above object, according to another aspect of the present invention, there is provided an apparatus for recognizing a code. The apparatus includes an image-acquiring portion for acquiring a raw image in which a code image is contained, a binary-coding converting portion for dividing the colors or shades of the raw image into two colors according to a predetermined reference value and generating a binary-coded image, an image-processing portion for extracting an area excluding a code image area from the binary-coded image, setting a color of the area corresponding to the extracted area in the standard image as a background color, thereby discriminating the code image area from other areas, extracting a plurality of cells included in the code image area, and recognizing the standard color or standard shade represented in each of the cells, a color-converting portion for correcting colors or shades recognized with respect to each of the cells included in the code image area, using environmental variables, and converting the corrected colors or shades into a plurality of standard colors or standard shades used to generate the code image, and a code-converting portion for extracting a corresponding character, number, or symbol from the color or shade recognized in each of the cells of the code image according to a relationship between the character, number, or symbol and the corresponding color or shade and generating code data.

To achieve the above object, according to another aspect of the present invention, there is provided a method for recognizing a code. The method includes the steps of acquiring a raw image in which a code image is contained, correcting colors or shades recognized from the raw image, using environmental variables, converting the corrected colors or shades into a plurality of standard colors or standard shades used to generate the code image, and generating a standard image represented by the standard colors or standard shades, dividing the colors or shades of the raw image into two colors according to a predetermined reference value and generating a binary-coded image, extracting an area excluding a code image area from the binary-coded image, and setting a color of the area corresponding to the extracted area in the standard images as a background color, thereby discriminating the code image area from other areas, extracting a plurality of cells included in the code image area, and recognizing the standard color or standard shade represented in each of the cells, and extracting a corresponding character, number, or symbol from the color or shade recognized in each of the cells of the code image according to a relationship between the character, number, or symbol and the corresponding color or shade and generating code data.

To achieve the above object, according to another aspect of the present invention, there is provided a method for recognizing a code. The method includes the steps of acquiring a raw image in which a code image is contained, dividing the colors or shades of the raw image into two colors according to a predetermined reference value and generating a binary-coded image, extracting an area excluding a code image area from the binary-coded image, and setting a color of the area corresponding to the extracted area in the standard image as a background color, thereby discriminating the code image area from other areas, extracting a plurality of cells included in the code image portion, and recognizing the standard color or standard shade represented in each of the cells, correcting colors or shades recognized from the raw image with respect to each of the cells included in the code image area, using environmental variables, converting the corrected colors or shades into a plurality of standard colors or standard shades used to generate the code image, and extracting a corresponding character, number, or symbol from the color or shade recognized in each of the cells of the code image according to a relationship between the character, number, or symbol and the corresponding color or shade and generating code data.

BRIEF DESCRIPTION OF THE DRAWINGS

The above objective and advantages of the present invention will become more apparent by describing in detail preferred embodiments thereof with reference to the attached drawings in which:

FIGS. 2A through 2E illustrate various examples of code images to be read by the apparatus, FIGS. 3A through 3C illustrate examples of code conversion tables used to convert predetermined data into an image.

FIG. 6 is a flow chart illustrating the operation of the apparatus shown in FIG. 5;

BEST MODE FOR CARRYING OUT THE INVENTION

Hereinafter, the present invention will be described in detail by describing preferred embodiments of the invention with reference to the accompanying drawings.

Figure 1A:
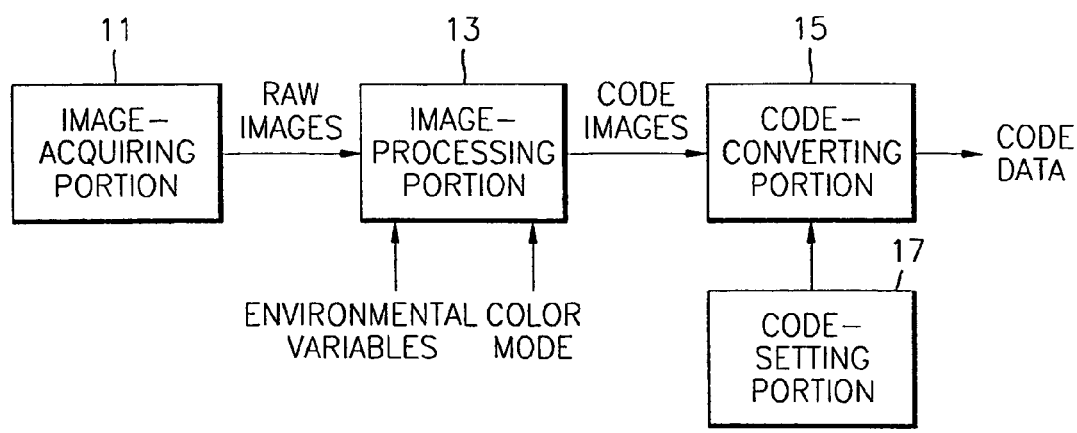
FIG. 1A is a block diagram of an apparatus for recognizing a code according to a first embodiment of the present invention.
Figure 1B:
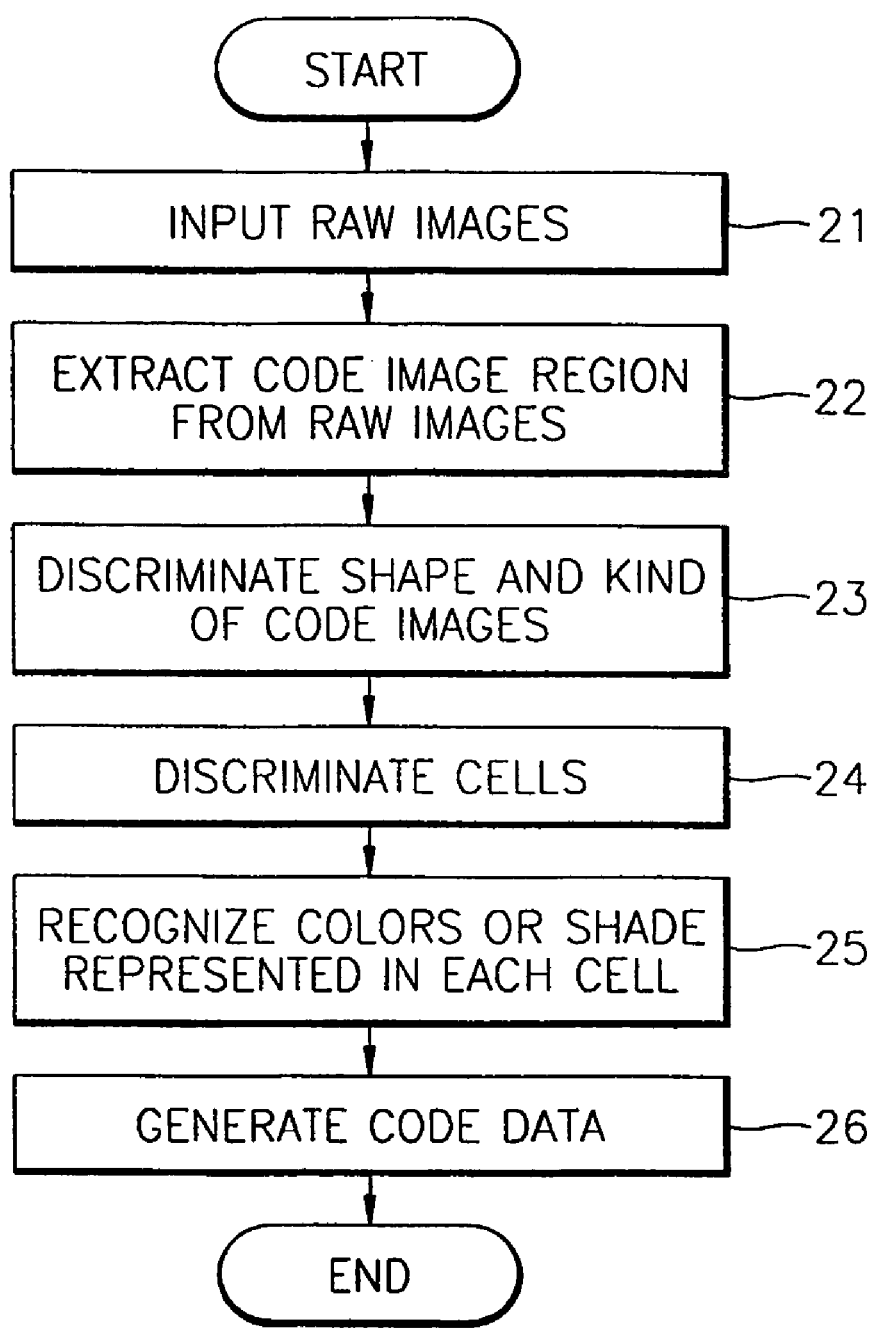
FIG. 1B is a flow chart illustrating the operation of the apparatus shown in FIG. 1A.
Figure 2A:
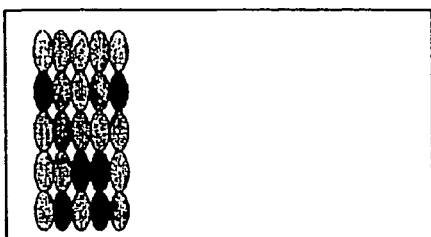
Figure 2B:
Figure 2C:
Figure 2D:
Figures 2E, 3A:
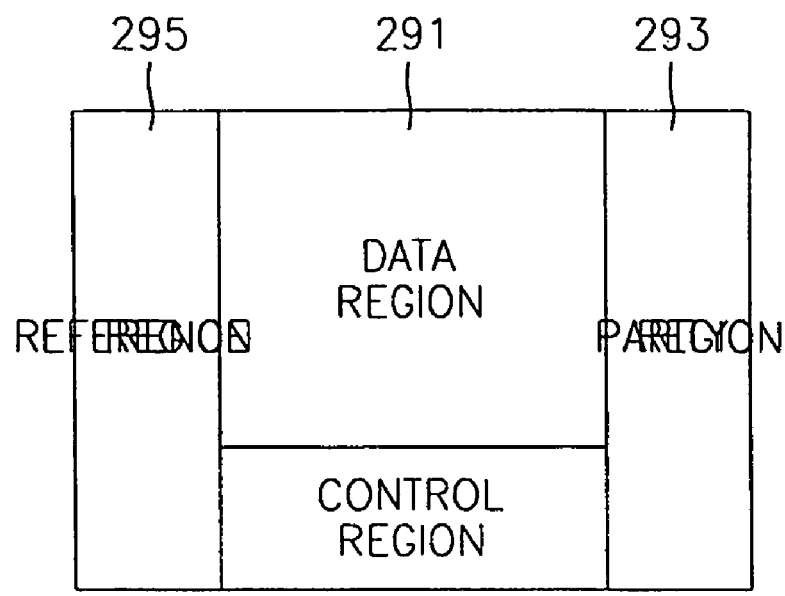
Figure 3C:
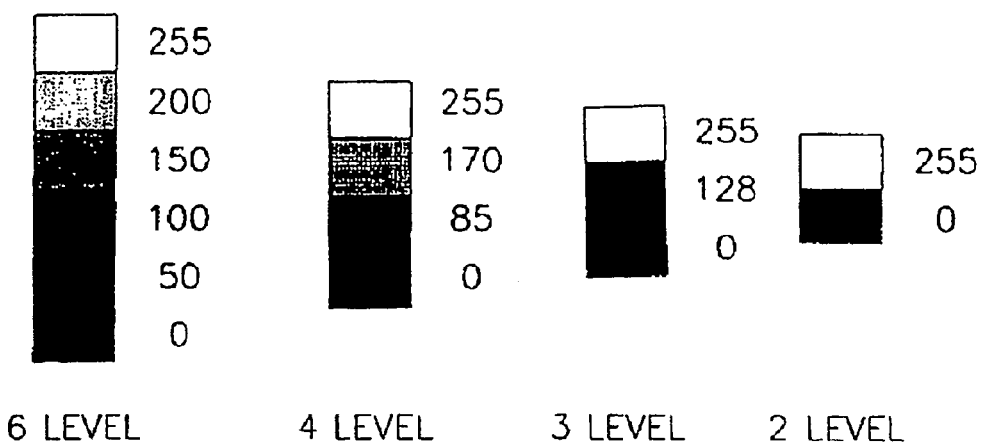
Figure 4:
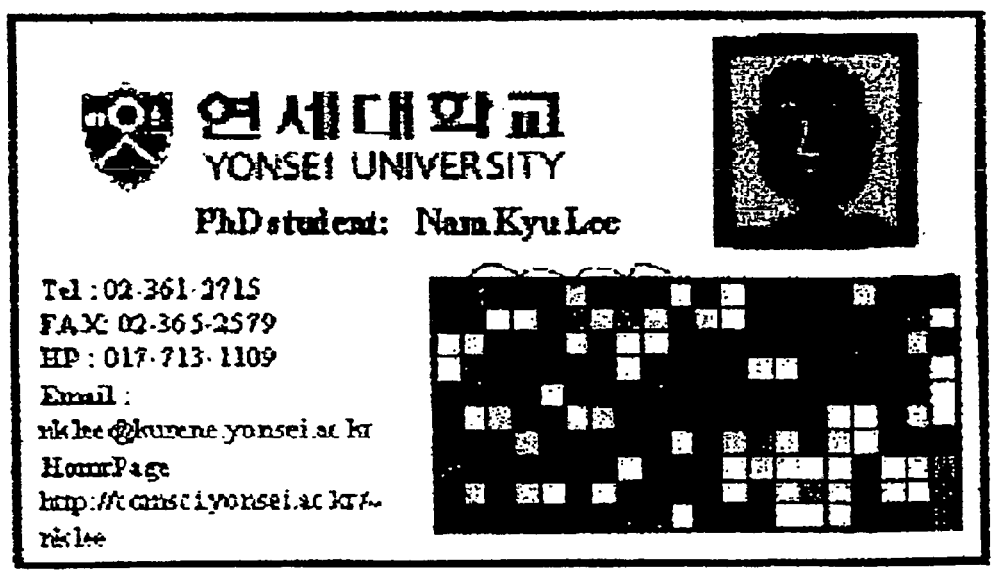
FIG. 4 illustrates an example in which a code image is incorporated into a name card.

FIG. 1A is a block diagram of an apparatus for recognizing a code according to a first embodiment of the present invention, and FIG. 1B is a flow chart illustrating the operation of the apparatus shown in FIG. 1A. FIGS. 2A through 2E illustrate various examples of code images to be read by the apparatus, and FIGS. 3A through 3C illustrate examples of code conversion tables used to convert predetermined data into an image, and FIG. 4 illustrates an example in which a code image is incorporated into a name card. The apparatus for recognizing a code reads a code image (an quadrangular image shown at a lower right corner of FIG. 4) represented on a physical medium and extracts an original code data corresponding to the code image. The code image are an image into which number, character, or symbol is converted using a code conversion table and may be expressed in various ways as shown in FIGS. 2A through 2D. First, the function and operation of the apparatus for recognizing a code will be described with reference to FIGS. 1A and 1B.

In step 21, an image-acquiring portion 11 acquires an image including a "code image", which is physically or electronically expressed. A code data to be eventually extracted is expressed as an image shape in the code image. The image-acquiring portion 11 reads the image physically expressed through an image input device, such as a scanner, a digital camera, a PC camera, a sensor, or a facsimile, and converts the read image into an image data, which can be electronically processed. Here, output of the image-acquiring portion 11 are referred to as "raw image", and the raw image is formatted as an image file, which can be processed by a computer. In general, a noise image or background with a code image is usually contained in the raw image.

An image-processing portion 13 extracts a code image from the raw image and recognizes the color or shade of individual cells contained in the code image. In step 22, based on a parameter such as an environmental variable and/or color mode, a code image region is extracted from the raw image. In step 23, the image-processing portion 13 generates data related to the code image based on the raw image and discriminates the shape, position, or type of code image. In step 24, the image-processing portion 13 discriminates the number, shape, and position of cells contained in the code image. In step 25, the image-processing portion 13 detects the color or shade of each cell. The image-processing portion 13 sets-up an environmental variable in consideration of the ambient environment at a time when the raw image is acquired, corrects the color or shade of individual cells using the environmental variable, and thereby detects the original color or shade of each cell.

The image-processing portion 13 extracts the code image region except for a background image portion from the raw images and discriminates the shape and type of code image, thereby discriminating the cells contained in the code image region on this basis. Preferably, the raw image is converted into a black-and-white image on the basis of a black-and-white environmental variable, which is set according to the degree of brightness in a state where the raw image is input. Preferably, a color of the background image portion of the black-and-white image is set by a peculiar background color, which is not used to represent code data. Preferably, then, a color of raw image portions corresponding to the background image portion in the black-and-white image is set by the background color, and by discriminating code image portions and background portions, the code image region is extracted from the raw image. An arithmetic operations required to extract the code image region may be reduced by using the black-and-white image.

Preferably, the image-processing portion 13 receives an image in which the code image portions and the other portions are divided by the background color, divides the received image into a plurality of blocks, detects a region having a color or shade that is not the background color from each of the blocks, selects a block having the largest region among all blocks, detects a center point of the code image region contained in the selected block, and searches the entire image on the basis of the center point, thereby detecting the region having a color or shade that is not the background color as the code image region.

A code-setting portion 17 establishes a relationship (i.e., FIGS. 3A through 3C) between a character, number, or symbol used for representing data and a corresponding color or shade. In step 26, a code-converting portion 15 extracts a corresponding character, number, or symbol from the color or shade of each cell of the code image according to the relationship provided by the code-setting portion 17, thereby generating a code data.

An example of setting an environmental variable used to read the color or shade of each pixel in an image will be described below. The environmental variable may be set to R, G, or B in a RGB mode, H, S, or V in a HSV mode, or combination of the R, G, and B and the H, S, and V, so as to normalize the color value or shade value, which is recognized in the raw image in consideration of an environment in which the raw image is read. In other words, values for a color environmental variable are added to or subtracted from color or shade values of pixels of the raw images. For example, the color or shade value may be a value for red, green, and blue in a RGB color mode; hue, saturation, and value (brightness) in a HSV color mode; cyan, magenta, yellow, and black in a CMYK color mode; or hue, intensity, and saturation in a HIS color mode. The color or shade represented in the raw image is adjusted to correct for the environment where the raw image was read, and thus the original color/shade can be obtained.

In general, an initial environmental variable is set on the presumption that a fluorescent light or a three-wavelength lamp was used for illumination. Otherwise, a white sheet of paper is used as a reference background before the raw image is input into a camera, and the environmental variable is set according to the ambient illumination. For example, the red light coming from a halogen lamp is relatively strong, and thus the environmental variable is set to remove the effect of the red light emitted from the halogen lamp. Next, if the actual color detected is normalized using the environmental variable, the effect of illumination can be reduced, and colors close to the original color can be obtained.

An example of correcting colors or shades using the environmental variable will be described below. An assumption that the code images are comprised of eight colors and coded using a code conversion table shown in FIG. 3B is made. In a case where the RGB value represented in a pixel of a raw image is recognized as (100, 100, 100), and the environmental variable is set to (+100, −50, +50), the corrected RGB value for the pixel, obtained by performing arithmetic operation on the RGB value and the environmental variable, is (200, 50, 150). For each component of the corrected RGB value, if the component is greater than 128, the component is converted to 255. Otherwise, the component is converted to 0. As a result, the final RGB value is (255, 0, 255), and thus the color or shade is discriminated as magenta.

EXAMPLE 1

In the RGB color mode, a maximum value for each component of RGB is 255, and the minimum value therefor is 0. Thus, (255, 0, 0) represents red, (0, 255, 0) represents green, (0, 0, 255) represents blue, (0, 0, 0) represents black, and (255, 255, 255) represents white. In a case where x is the value of R, G, or B, and y is the value of an environmental variable for each of R, G, and B, the components for the final RGB value for each pixel are determined as below.

$$f(x) = 255, \text{ if } x + y \geq 128 \text{ (where } 0 \leq x, y \leq 255) \quad (1)$$
$$0, \text{ otherwise}$$

EXAMPLE 2

YIQ and YUV color modes are obtained by assigning a predetermined weight to the RGB value and are similar to the RGB mode. That is, the YIQ color mode may be obtained using Y=0.299R+0.587G+0.114B, I= 0.596R−0.274G−0.322B, Q=0.211R−0.523G+0.312B. Y denotes brightness, and I and Q denote the degree of redness and blueness, respectively.

$$f(y) = \text{white}, \ y \geq 0.5 \quad (2)$$
$$\text{black, otherwise.}$$

EXAMPLE 3

A CMYK color mode is a color mode usually used for printing, and each color component is indicated as percentage or ratio in the CMYK color mode. The CMYK color mode is expressed as (R/255, G/255, B/255) in relation to the RGB value. In a case where x is a value for C, M, Y or K, and y is a value of the environmental variable corresponding to each color component, the final CMYK value for each pixel is determined as below.

$$f(x)=1, \text{ if } x+y \geq 0.5 \text{ (where } 0 \leq x, y \leq 1)$$
$$f(x)=0, \text{ otherwise} \quad (3)$$

EXAMPLE 4

In the case of HSV and HSI color mode, the value for hue is expressed as angle. Here, in a case where x is the value for a hue and the color environmental values are set so that $0 \leq Trg < Tgb < Tbr \leq 360$, a method for discriminating colors may be adopted as below.

$$f(x) = \text{red}, \quad \text{if } Tbr \leq x < Trg \quad (4)$$
$$\text{green}, \ \text{if } Trg \leq x < Tgb$$
$$\text{blue}, \quad \text{if } Tgb \leq x < Tbr$$

EXAMPLE 5

For the Commission Internationale de l'E clairage (CIE) color mode, the value of a color is represented on an x-y graph. In this case, x and y are used as a reference for discriminating colors, and thus a method for discriminating colors may be adopted as below.

$$f(x, y) = \text{red}, \quad \text{if } x \geq 0.4 \quad (5)$$
$$\text{green}, \ \text{if } x < 0.25, \ y \geq 0.4$$
$$\text{blue}, \quad \text{if } x < 0.25, \ y < 0.25$$
$$\text{gray}, \quad \text{otherwise}$$

Data related to a relationship between a general environment and an environmental variable to be set according to the general environment are stored in a database, and preset data with respect to an actual working environment are read, and thus the environmental variable may be used. The environmental variable is determined experimentally such that colors read by an input optical device are corrected into original colors, or the code images are discriminated from the background, by analyzing the optical characteristics and the ambient illumination of the input optical device, and thereby the colors may be recognized without errors while not being affected by a device or environment. In addition, two or more environmental variable groups having different objectives may be formed. In other words, one of the environmental variable groups may be an environmental variable for separating the code images from the background, and the other may be an environmental variable for discriminating the color or shade of the code images separated from the background. For example, the value for R is relatively high when colors are discriminated for the RGB mode in the environment of illuminating using red light. Thus, the value for R read in the optical device is reduced to a predetermined weight value, and the effect of the environment is excluded. When the code image in the environment of bright illumination is discriminated as black and white for the HSV mode, the weight value of the V component is increased, and thereby colors are discriminated. In the environment of dim illumination, the weight value of the V component for discriminating the black-and-white color in the HSV mode from colors excluding black or white are reduced, and the weight value of the S component is also reduced, and thereby colors are discriminated. When the environmental variable is reset, the distribution of the values for R, G, B, H, S, and/or V, which are obtained from each cell in the code image by the optical device, is determined, and the environmental variable and a weight value thereof may be reset with reference to the distribution.

Examples of code images to be processed by the apparatus for recognizing a code shown in FIG. 1A and code data corresponding to the code image will be described below. FIGS. 2A through 2D illustrate various examples of code images, which can be recognized by the apparatus for recognizing a code according to the present invention. In the drawings, various shapes for cells, for example, quadrangular, circular, elliptical, cross-shaped, or honeycomb shaped, may be realized, and a combination of shapes may be possible when a code image is formed. The shape and size of a code image or cell may be properly selected according to the content or amount of data to be represented in the code image. Various shapes of the code image comprised of a plurality of cells, such as quadrangular, circular, elliptical, cross-shaped, or honeycomb shaped, may be realized, and a code image having a similar shape to a barcode shown in FIG. 2D is also included.

FIG. 2E illustrates the regions of a code image based on roles of data represented in the code image. The code image include a data region 291, which is formed of at least one data cell in which colors, shade, shapes, patterns, or a combination thereof is differently encoded according to the content of data. The data region 291 may be formed of one or more data cells in which characters are encoded as images, and each of the data cells may represent a character, or a set of a plurality of data cells may represent one or more characters. For example, the character "A" may be represented as a red cell, or may be represented as two cells such as one red cell and one green cell. Code data contained in the data region 291 are comprised of characters, numbers, and symbols, and may comprise names, addresses, telephone numbers, fax numbers, host addresses of networks, domain names and IP addresses used in Internet, uniform resource locators (URLs), protocols, or document names depending on user's demands.

At least one of a parity region 293, a reference region 295, and a control region 297 may be further included in the code image. The parity region 293 is comprised of parity cells for checking recognition errors of the cells represented in the data region 291. The reference region 295 is comprised of at least one reference cell, which provides reference colors, reference shade, reference shapes, reference patterns, or a combination thereof for determining colors, shade, shapes, patterns or a combination thereof of the data cell formed in the data region 291. The control region 297 is comprised of at least one control cell, in which control data for commands or services to be provided using data represented in the data region 291 are encoded. Hereinafter, all regions excluding the data region 291, i.e., the parity region 293, the reference region 295, and the control region 297, are referred to as "auxiliary regions", and cells included in the auxiliary regions are marked as auxiliary cells.

The parity region 293 is used to determine whether colors or shades (or possibly, shapes and/or patterns) are expressed to be suitable for data cells according to the content of code data. In the parity region 293, parity data are obtained according to code values designated corresponding to the color or shade represented in each of the data cells, and parity cells are formed of colors or shade corresponding to the parity data.

The reference region 295 is used to set reference colors (or reference shades, reference shapes, or reference patterns as occasion demands) for recognizing colors (or shades, shapes, or patterns) represented in the cells of the data region 291 and/or the auxiliary regions. The colors of the cells in each region may be represented in a color mode such as a red green blue (RGB) color mode, a hue saturation value (HSV) color mode, a cyan magenta yellow black (CMYK) color mode, a hue saturation intensity (HSI) color mode, a CIE color mode, a YIQ or YUV color mode. Even in case where a code is formed by black-and-white shades (greyscale), data of each cell can be precisely recognized on the basis of the shades of white and/or black represented in the reference region 295.

In addition, a boundary region for discriminating regions may be further implemented between regions included in the code images. In addition, a boundary region for discriminating cells may be further included between cells in each region. The boundary region may be comprised of a line or a cell formed of a specific color or pattern, and a boundary line or boundary cell may be formed as black or white.

Color can be printed differently depending on the kind of printer or the material used as the printing paper, and the same color may be slightly differently recognized according to the characteristics of a scanner or camera. In consideration of this, the reference cell included in the reference region 295 provides a reference for discriminating colors represented in the data region 291. That is, even if color is differently output depending on the output device used, or color is differently input according to the input device used such as a scanner, a color difference between the color of the reference region 295 and the color of the data region 291 is constant, and thus colors of the cells in the data region 291 can be precisely recognized. Thus, colors of the cells of the data region 291 have a relative color difference compared with reference colors of the reference region 295, and thus the colors of the cells of the data region 291 are obtained by being compared with the reference colors of the reference region 295 on the basis of the RGB mode or HSV mode, and thereby data of the data cells can be precisely recognized even if an image input device or output device is changed. In a case where shapes or patterns are input into an input device such as a camera, the shapes or patterns may be inclined or warped. The reference shapes or reference patterns are provided in the reference region 295, and thus a wrong input state can be sensed, and the shapes or patterns of the data cells can be precisely recognized.

Various services can be provided to a user using code data of the data region 291 depending on the type of application.

For example, in a case where a homepage address (that is, a URL) on the Internet is expressed on a name card as code images, the code images are decoded by a computer, and the web browser of the computer or a server connected to the computer is executed and thereby can be programmed to contact the homepage. In addition, in a case where an electronic mail address is expressed as a code image, the code image is decoded by a computer, and the mailing software of the computer is executed, thereby providing an environment where electronic mails can be sent to the electronic mail address. As another example, in a case where the code image is input into a portable terminal, a user can call a telephone number corresponding to the code image or receive services of data related to geography. In such a case, the automatic service function can be automatically implemented by a separate program or in accordance to the kind of objective data in a decoding program. In addition, the control region 297, in which a command for executing the automatic service function is expressed as an image, is included in the code image and thereby automatically implement services in the decoding program by using control data decoded from the control region 297.

In addition, commands or meta-data for controlling objective data of the data region 291 can be included in the control region 297. For example, data encoded in the control region 297 may include various meta-data such as the decoding order of the cells formed in the data region 291, the position of the reference cell of the reference region 295, and the position or property of the parity region 293.

FIG. 3A illustrates an example in which two bits of data are expressed as four colors. If each cell has one of four colors, two bits of data can be expressed. Then, in a case where it is defined that one character is expressed as four consecutive cells, 8 bits, that is, 256 kinds of characters can be expressed. Meanwhile, in a case where there are four kind of shapes for a cell with the same color(i.e., small quadrangle, large quadrangle, small circle, and large circle), two bits of data can be expressed, and 256 kinds (8 bits) of data can be expressed in a case where each cell may be filled with four different colors.

FIG. 3B illustrates an example of a code conversion table for converting various characters (alphabets or special characters), numbers, or shapes into images, and in the example, one character is mapped as one or two color cells.

In view of an encoding method using the code conversion table of FIG. 3B, various characters are converted into code values, and then code images are generated as colors allocated to each of the code values. In the present embodiment, the code images are generated using eight colors, and two consecutive cells are used so as to express one character or number. Code values from "000" to "111" are allocated to the eight colors, and each character is encoded as two colors. For example, the number "3" is allocated to the code value "000 011", is encoded as a color (black) allocated to the code value "000" and a color (cyan) allocated to the code value "011", and therefore is imaged as two consecutive cells of one black cell and one cyan cell. Various characters or numbers included in code data are converted into code values according to the code conversion table shown in FIG. 3B, and then colors corresponding to the code values can be expressed as a quadrangular matrix shape comprised of a combination of quadrangular cells.

FIG. 3C illustrates an embodiment in which a code images is generated using a greyscale code. The greyscale code is formed according to the brightness of a greyscale tone instead of the mixing rate of red (R), green (G), and blue (B). Thus, in the reference region 295, a reference shade is set to either black, white, or grey, and the cells in the data region 291 have values which are coded by a grey difference compared with the reference shade of the reference region 295. In a case where there is no reference region 295 in the code image, the shade of each cell of the code image is calculated, and cells (cell set) having similar shades are collected. The same code value is allocated to the cells belonging to the same cell set, and then errors in decoding can be determined using the parity region 293. In a case where determination errors occur, it is again determined whether errors occur after the shade of each cell is recalculated or a reference for forming a cell set is differently set. The greyscale code image may be applied to media which are printed mainly with black and white, such as newspapers.

Figure 5:
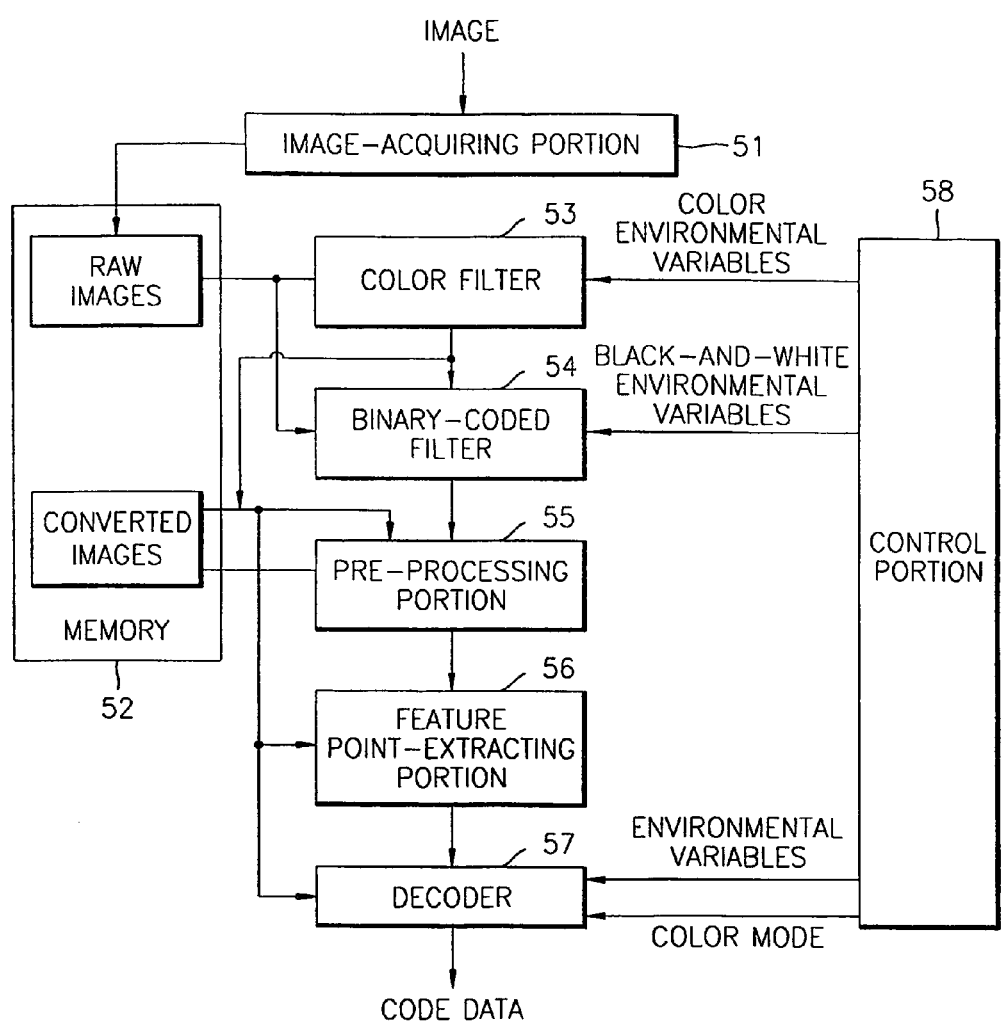
FIG. 5 is a block diagram of the apparatus according to a second embodiment of the present invention.

FIG. 4 illustrates an example in which a code image is essentially adopted into a name card, using the above code system. In the case of using the apparatus for recognizing a code shown in FIG. 1, a user can generate an image file in which portions of a quadrangular code image represented at the lower right corner of the name card are included, using a camera or scanner, and the user can process the image file and recognize code data, which are to be represented by the code image. FIG. 5 is a block diagram of the apparatus according to a second embodiment of the present invention, and FIG. 6 is a flow chart illustrating the operation of the apparatus shown in FIG. 5.

An image-acquiring portion 51 acquires a raw image in which a code image is contained. An image file acquired by an image input device, such as a camera or scanner, or an image file existing in the format of an electronic file is received, and the data format of the image file is converted if necessary. For example, a compressed video image file is uncompressed and converted into an image file having a bit map shape. In this way, the image file is stored in a memory 52 as a raw image. An ambient noise image with a code image, which the user wants to detect, is also included in the raw image.

A control portion 58 receives the type of the code image, sets an environmental variable in consideration of an environment at a time where the raw images are acquired, or reads an environmental variable already stored and transmits the environmental variable to a color filter 53. The memory 52 temporarily stores image data required for image processing.

The color filter 53 corrects colors or shades recognized from the raw image by the environmental variable, converts the corrected colors or shades into standard colors or standard shades, which are used to generate the code image, and thereby generates a standard image represented by the standard colors or standard shade. Here, standard colors or standard shades mean colors or shade which are set to correspond to characters, numbers, or symbols when the code image is generated (see FIGS. 3A through 3C). The code image displayed in physical media may be not represented as originally set colors or may not recognize the original colors due to the characteristics of an image device or the effect of an ambient environment when the code image is printed by an image ,output device or when .the code image is processed by the image input device. For example, although the RGB value of magenta is (255, 0, 255), the RGB value recognized from the cell to be represented as magenta is not exactly (255, 0, 255) but will be some value near to (255, 0, 255). Thus, code data can be extracted by applying the code conversion table only if the colors or shades actually recognized are converted into standard colors or standard shades. A binary-coded filter 54 divides colors or shades of the raw image into two colors according to a predetermined reference value (black-and-white environmental variable) and generates a binary-coded image. The binary-coded image may be implemented as black and white or two specific colors. Here, a reference value may be set to the averaged value of values for R, G, and B or a minimum value or maximum value among them, a value for V of the HSV color mode, a value for I of the HSI color mode, or a value for K of the CMYK color mode.

A pre-processing portion 55 receives the raw image and the binary-coded image, sets a color of a portion excluding the code image portion in the binary-coded image as a specific background color, sets a color of a portion of the standard image, which corresponds to the portion set as the background color in the binary-coded image, as the background color, thereby discriminating a code image portion from other portions. For example, a color of pixels positioned at an edge of the binary-coded image is set as the background color, and then a color of pixels connected to the pixels set as the background color is also set as the background color, thereby discriminating the code image portion from the other portions. Here, the background color is set to one of colors, which are not used to generate the code image. A feature point-extracting portion 56 extracts a plurality of cells included in the code image portion and then recognizes the standard colors or standard shade represented in each cell.

A decoder 57 extracts a corresponding character, number, or symbol from the color or shade recognized in each cell of the code images according to a relation between characters, numbers, or symbols and the corresponding color or shade, and generates code data. Preferably, a color or shade, which is most distributed among the colors or shades of the pixels belonging to each cell, is recognized as a color of the corresponding cell.

The operation of the apparatus for recognizing a code shown in FIG. 5 will be described below with reference to the flow chart of FIG. 6. In step 61, the raw image, in which the code image is included, is acquired. In step 62, the environmental variable is set in consideration of an environment at a time when the raw image was acquired, and the colors or shade recognized from the raw image is corrected by the environmental variable. In step 63, the corrected colors or shades are converted into a plurality of standard colors or standard shades, which are used to generate the code image, and thus the standard image represented by the standard colors or standard shades is generated.

In step 64, the binary-coded image is generated by dividing the colors or shades of the raw image into two colors according to a predetermined reference value. In step 65, a color of the portion excluding the code image portion is set as the specific background color on the basis of the binary-coded image. In step 66, the portion of the standard image corresponding to the portion set as the background color in the binary-coded image is processed as the background color, and thus the code image portion can be discriminated from the other portions.

In step 67, the plurality of cells included in the code image portion are extracted, and then the standard color or standard shade represented in each cell is recognized. In step 68, a corresponding character, number, or symbol is extracted from the color or shade recognized in each cell of the code image according to the relationship between the character, number, or symbol and the corresponding color or shade, thereby generating code data.

The function and operation of the apparatus for recognizing a code shown in FIG. 5 will be described in greater detail.

The binary-coded filter 54 converts the raw image into a black-and-white image according to the black-and-white environmental variable. The black-and-white image is used to facilitate discrimination of an object included in the raw image and to improve the working speed. The brightness value of each pixel of the raw image is compared with the environmental variable value and output as a pixel that is black or white, and thus the black-and-white image is generated. The black-and-white environmental variable means a parameter or a set of parameters for converting colors represented in the raw image into black or white, such as the averaged value in which the sum of the values for red, green, and blue is divided into 3, or the value (brightness) of the HSV color mode. In a case where the total brightness of the raw image is relatively dark (this may be the case when the ambient environment is slightly dark when the raw image is scanned, or the brightness is low due to the characteristics of the image device), the value of the black-and-white variable is set low. In a case where the total brightness of the raw images is relatively high, the value of the black-and-white variable is set high.

For example, in a case where the RGB value in a pixel of the raw image is (100, 100, 100), the average brightness of the pixel is 100. In such a case, assuming that the value of the environmental variable is 80, a pixel having a value brighter than the environmental variable value is recognized as white. Otherwise, the pixel is recognized as black.

When a color image is binary-coded into a black-and-white image, black or white pixels may be generated by applying a reference value to all pixels or may be generated by dividing the entire image into several portions, setting a reference value with respect to each of the portion, and applying the reference value to pixels belonging to the each of the portion. That is, in view of a local threshold value method, the images are divided into blocks having predetermined sizes, the brightness value of pixels belonging to each of the blocks is averaged, and the averaged value is set as the black-and-white environmental variable. The brightness value of each pixel is compared with the black-and-white variable value, and thus pixels belonging to the blocks can be binary-coded as black or white. The method is most effective in a case where the whole image is locally dark or bright.

A multiple threshold value method may be adopted when a color image is converted into a black-and-white image. A histogram of the brightness value of the pixels belonging to the image is obtained. The brightness frequency can thus be obtained. The histogram can be divided into brightness values having a high frequency and brightness values having a low frequency. In general, the brightness value of each pixel is shown convergent to the specific brightness value. Thus, brightness values having a lower frequency, which are positioned among brightness values having a higher frequency, are set as a plurality of. black-and-white environmental variables, and then the plurality of black-and-white environmental variables are applied to the color image in order. As a result, in a case where an image has a greater variation in brightness, the most appropriate variable is selected among the plurality of black-and-white environmental variables, so a proper black-and-white image can be generated.

Figures 7A, 7B, 7C, 7D, 7E, 7F:
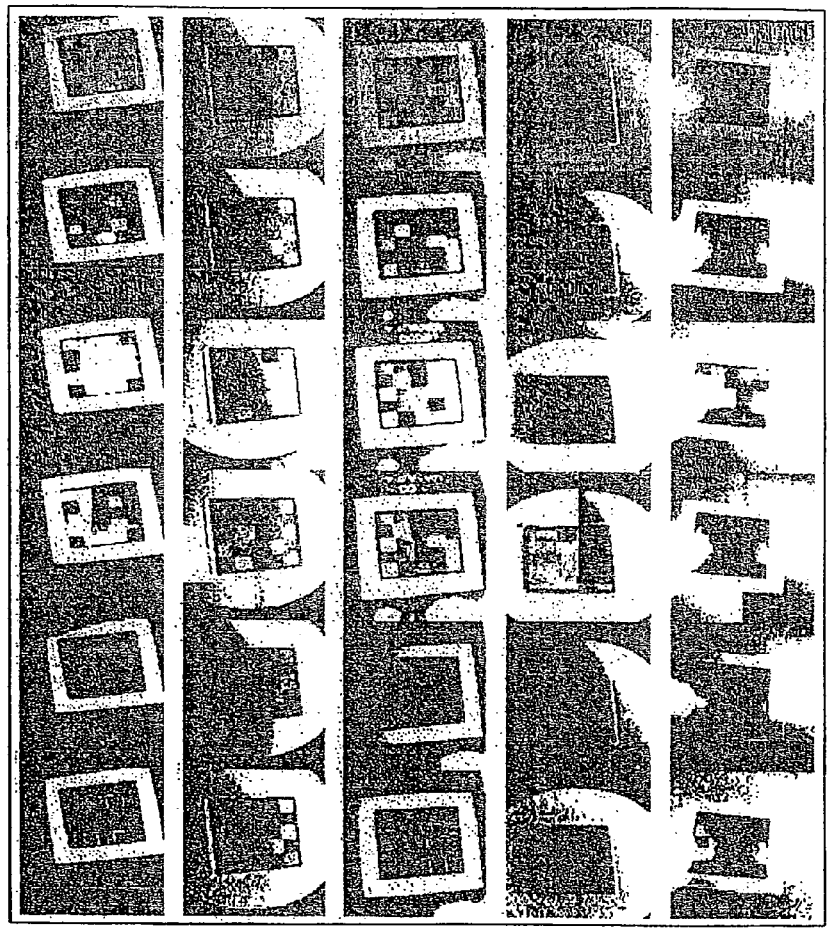
FIGS. 7A through 7F illustrate results in which black-and-white images are obtained from raw images.
Figure 8C:
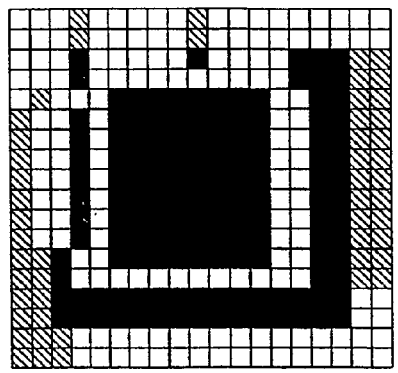
FIGS. 8A through 8F illustrate steps of removing a noise image from a black-and-white image.
Figure 8F:
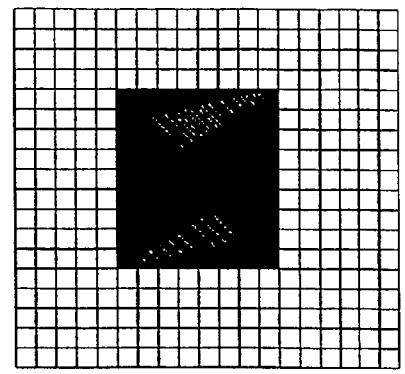
Figure 8B:
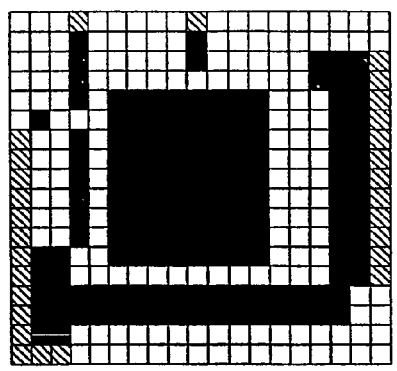
Figure 8E:
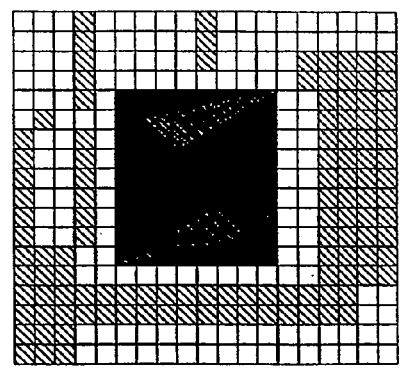
Figure 8A:
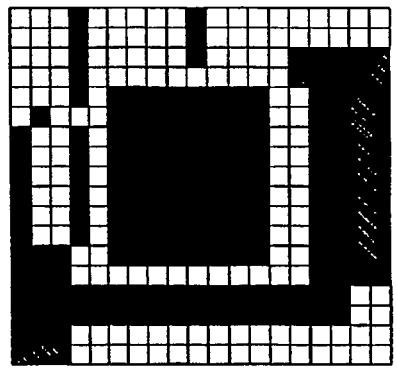
Figure 8D:
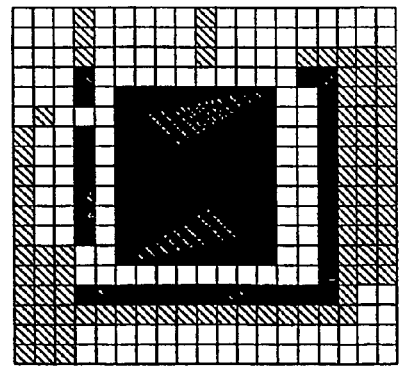

FIG. 7 illustrates the result in which a black-and-white image is obtained from raw image. FIG. 7A illustrates the raw images. The raw image is actually a color image but represented as a greyscale image due to the limitation in the expression of the drawings. FIG. 7B illustrates the example in which the values for R, G, and B of pixels are averaged, and the averaged value is compared with the reference value of 128, to obtain the black-and-white image. For FIG. 7C, the reference value is set to 90. FIG. 7D illustrates an example that adopts the local threshold value method. FIG. 7E illustrates the example in which the minimum value among the values for R, G, and B of pixels is compared with of the reference value of 128 to obtain a black-and-white image, and for FIG. 7F, the reference value is set to 90.

The pre-processing portion 55 receives the color image and the black-and-white image, compares the color image with the black-and-white image, and thus removes a unnecessary noise image from the color image and the black-and-white image. The step of removing the noise image on the basis of the black-and-white image is performed by steps of removing a background image and a small noise image and will be described in detail with reference to FIGS. 8A through 8F.

In general, white or a redundant blank having high luminance exists around the code images, and the region of the code images is separated from adjacent regions. In step of removing the background image, the connection state of the noise image is checked, and then the background image can be removed. FIGS. 8A through 8F illustrate the step of removing the background image. First, the noise image position at the edges of the black-and-white image (see FIG. 8A), that is, pixels having a black color among pixels positioned at the edges of the black-and-white image, are set its color as a specific shade or color, which is a color or shade that is not represented in cells of the code image and referred to as a "background color" (see FIG. 8B). The entire region is checked, and pixels connected to the noise image and also set its color as the background color. In other words, black pixels connected to the pixels represented by the background color is detected in order, and a color of the pixels are set as the background color (see FIGS. 8C through 8E). If there are no further black pixels connected to the pixels having the background color, the portion set as the background colors is determined as the region of the noise image, and the portion comprised of the black pixels among the portion excluding the region of the noise image is determined as the region of the code image. In such a case, in order to check the connection state of the noise image, it is efficient that pixels belonging to the noise image are simultaneously searched in all directions such as from left to right or right to left, from up to down, or from down to up. In the step of removing the small noise image, the connection state of each of the pixels is checked from the image from which the background noise image is removed, the length or area to which the pixels are connected is less than a reference value, and then this image is determined as the small noise image, thereby removing the small noise image. For example, in a case where the number of pixels that are black in a portion having a predetermined area is less than the reference value, this image corresponding to the portion may be determined as the noise image. In this way, the code image portion is formed when the portion determined as the noise image and a white pixel portion are excluded from the black-and-white image.

The result of the noise image removed from the black-and-white image is applied to the color image, and so the region of the code image is extracted from the color image. For example, a pixel existing in a position (coordinate) which is determined as the noise image in the black-and-white image, is also determined as the noise image even in the color image.

Figure 9:
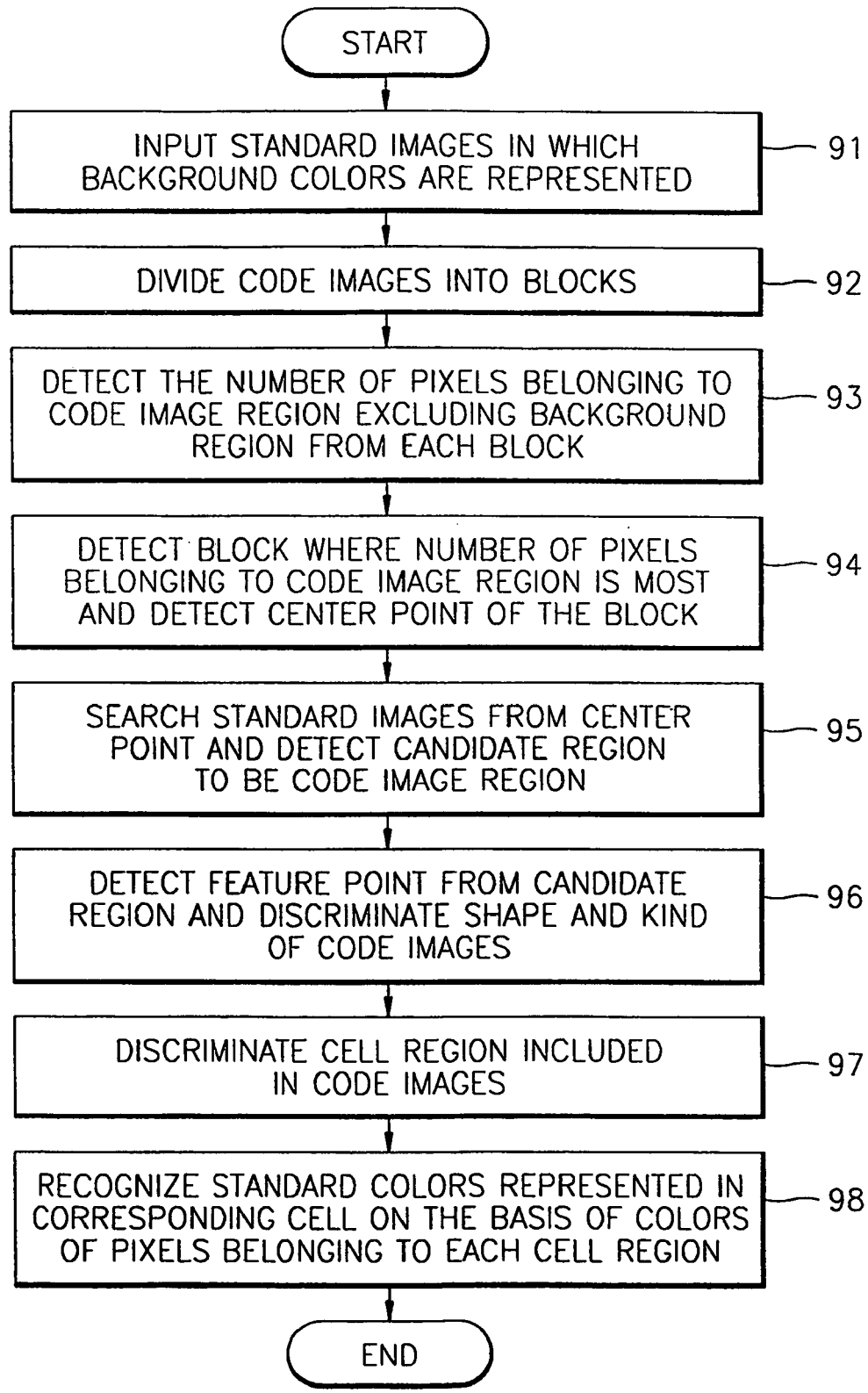
FIG. 9 is a flow chart illustrating the step of recognizing a standard color represented in each pixel of the code image.

The feature point-extracting portion 56 receives the color image and/or black-and-white image from which the noise image are removed, searches the feature point comprising the image (code image) of a specific object and its region, searches data related to the type and position of the code image from the feature point of the object, and determines errors. The feature point-extracting portion 56 is implemented by performing steps of dividing a standard image into blocks, searching the region of the code image, extracting the feature point from the searched region of the code image and determining the type of a code. FIG. 9 is a flow chart illustrating the step of recognizing standard colors represented in each cell of the code image.

Figure 10A:
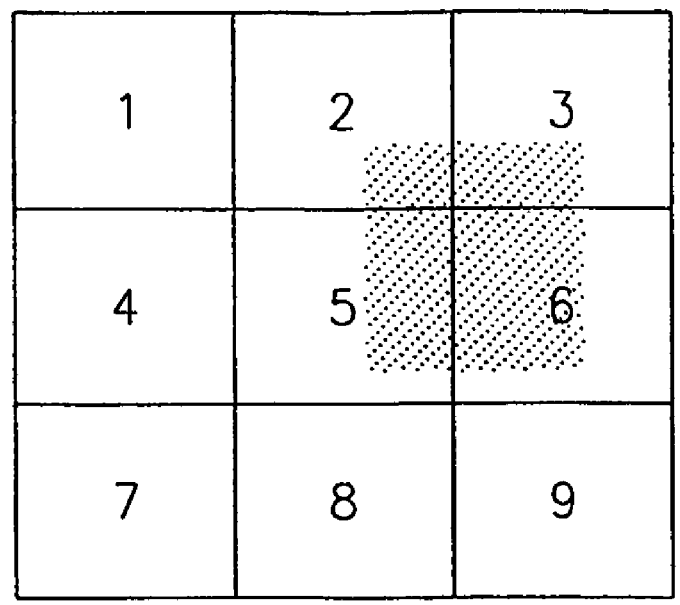
FIGS. 10 through 14 illustrate examples for explaining FIG. 9.

In a case where the standard image in which the background color is represented (or from which the noise image is removed) is input in step 91, the standard image is divided into blocks so that the region of the code image can be searched in step 92. FIG. 10A illustrates how the entire image is divided into blocks having predetermined sizes. A portion represented as a shaded quadrangle denotes a region with the code image. In a case where the sizes of significant image belonging to corresponding blocks after the image is divided into the blocks, are checked, the position of the code image may be estimated. Here, the significant image means the code image portion excluding the noise image portion of which color is set by the background color. Thus, the center point of the block where the region of the code image belonging to each block is the largest, is searched, and the region of the code image is searched on the basis of the center point. In other words, in step 93, the number of pixels belonging to the region of the code image that is not the background region for each block is detected. In step 94, the block with the greatest number of pixels belonging to the region of the code image, is detected, and the center point of the block (or the center point of the region of the code image belonging to the block) is detected.

Figure 10B:
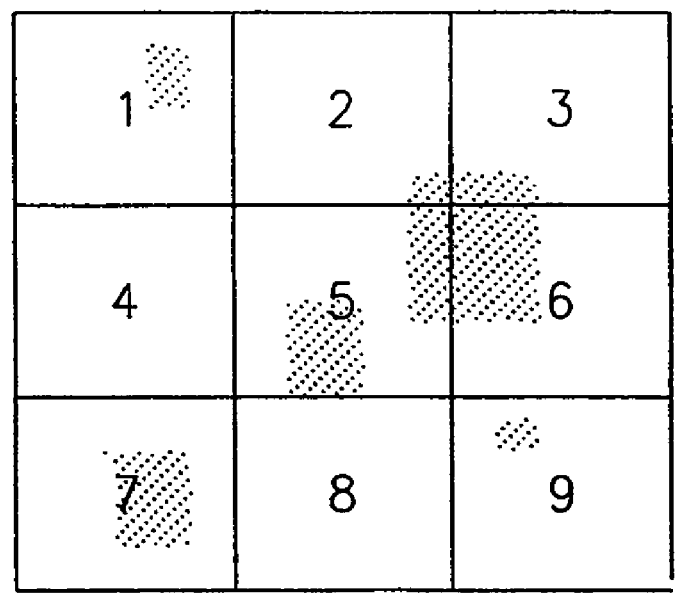

The region of the entire image is divided into a plurality of blocks, and then the region of the code image is searched, and thereby the arithmetic operations required for processing can be reduced. In a case where the shape of the code image is quadrangle and the position of the code image is roughly known, the arithmetic operations can be reduced. In a case where the number of pixels belonging to the region of the code image in each block is calculated in FIG. 10A, the number of pixels belonging to the code image is greatest in block 6, and decreases in order from blocks 2, 3, and 5. Thus, in a case where an image arithmetic operation is performed only in the region of blocks 2, 3, 5, and 6, not blocks 1, 4, 7, 8, or 9 where there are no or few pixels belonging to the region of the code image, the number of arithmetic operations performed can be greatly reduced. As shown in FIG. 10B, in a case where the code image are comprised of a plurality of images separated from one another in space, there are a plurality of regions of the code image. Preferably, in such a case, the image region having the largest size among the plurality of code images, which is assumed to be the region of the code image, is first searched, and then other image regions are checked in the order of size.

Subsequently, the step of searching the region of a code, in which the code image is formed, on the basis of the center point searched in the step of dividing standard image into blocks is performed. In step 95, the entire standard image is searched from the center point, and a candidate region to be the region of the code image is detected. In step 96, the feature point is detected from the candidate region, and thereby the shape and type of the code image are determined. In this step, the region of a figure formed by circumscription points of the candidate region is searched, which may be result in a quadrangular region or a circular region, and the image comprised of the detected region become a code image. And then, cell regions in the code image is discriminated each other in step 97, and standard colors represented in a corresponding cell is recognized on the basis of colors of pixels belonging to each cell region in step 98.

Figure 11A:
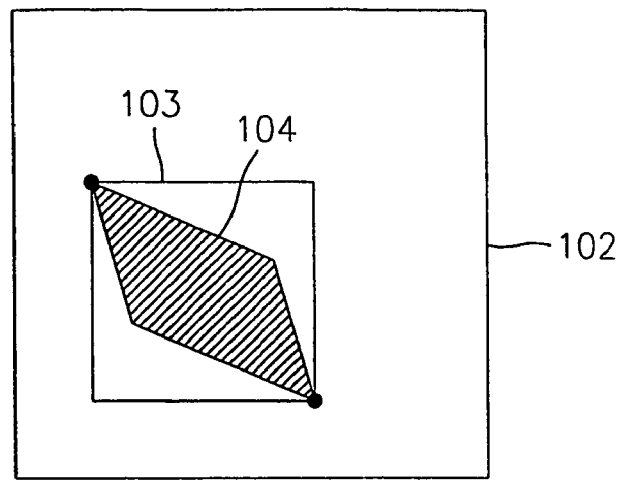
Figure 11B:
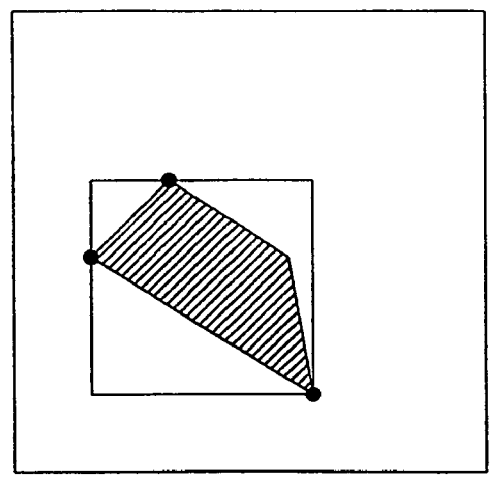
Figure 11C:
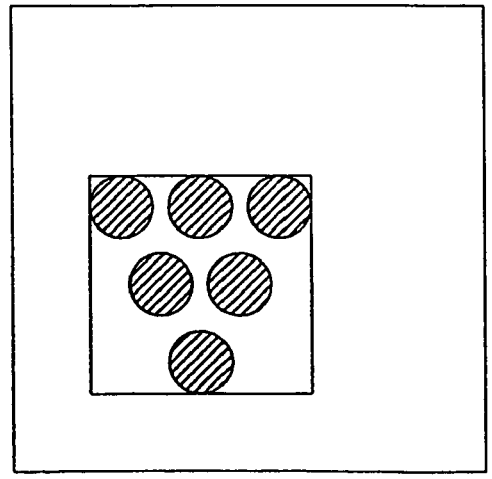

FIGS. 11A through 11C illustrate the step of detecting the candidate region, and regions 104 marked by slanted line denote a code image region, which is to be actually obtained, and candidate regions 103 including the regions 104 are detected. The step is to simplify a process by selecting a partial necessary image region from the entire images and performing a future arithmetic process with respect to the partial image. An extreme point (i.e., a point having minimum and maximum values on x and y coordinates) of an image region estimated as the code image is obtained, and a figure comprised of the extreme point is determined as the candidate regions 103. For example, coordinates having minimum and maximum values on an x-axis and minimum and maximum values on an y-axis among pixels belonging to image excluding a background region from regions 102 of the blocks 2, 3, 5, and 6 selected from FIG. 10A are obtained, and a figure (quadrangle) formed by the coordinates is determined as a candidate region.

A method for searching a candidate region includes a reduction search method and an extension search method. In view of the extension search method, a region corresponding to the code image is searched while being extended to an outside from the center point. That is, the code image region is searched by being extended to a portion determined as the code image region that is not the background region. In view of the reduction search method, the code image region is searched by being reduced to the center point from the outside. In a case where the code image is formed of quadrangle, the candidate region is expressed as a left upper coordinate and a right lower coordinate. In a case where the code image is formed of circle, the candidate region is expressed as the coordinate of the center point and the length of the radius.

Figure 12A:
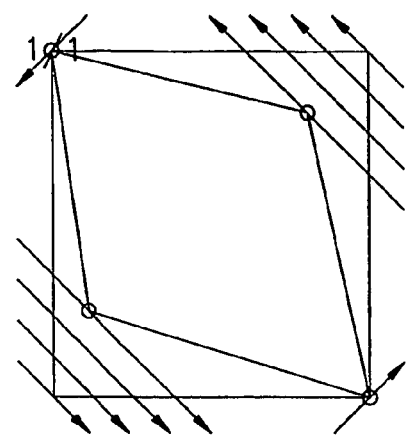

A method for determining a feature point includes a diagonal search method or a boundary detection method. In view of the diagonal search method (see FIG. 12A), the feature point is searched using a segment having a temporary slope in the candidate region. For example, in a case where the code image is formed of quadrangles, in order to search vertices of the quadrangular code image in the candidate region, a diagonal having an angle of 45 degree is drawn at vertices of the candidate region, and thus a quadrangular region formed of points externally contacting the diagonal is searched. As shown in FIG. 12A, a point where a pixel belonging to the code image region that is not the background region by using the diagonal having the angle of 45 degree beginning at each vertex of the candidate region, contacts the diagonal, is determined as the feature point. The diagonal with respect to each vertex of the candidate region has a predetermined direction such as counterclockwise or clockwise.

Figure 12B:
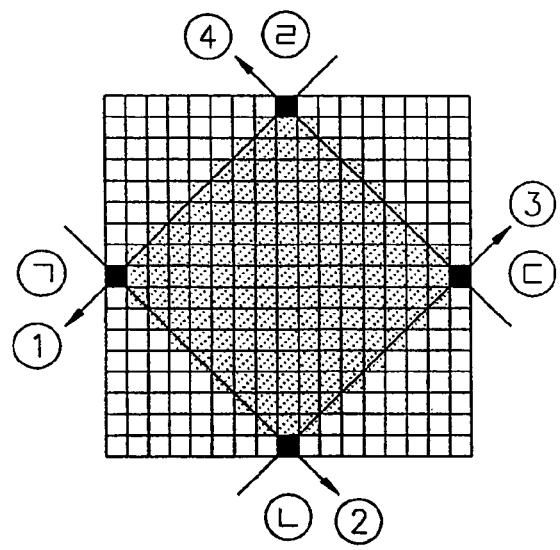
Figure 12C:
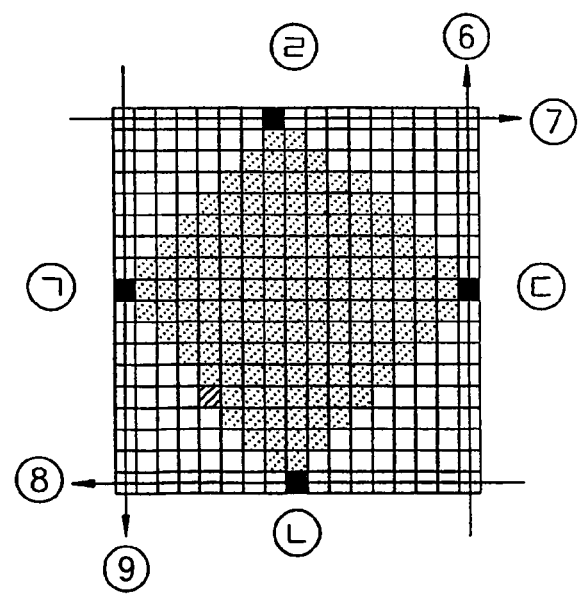

FIGS. 12B and 12C illustrates the diagonal search method in greater detail.

In FIG. 12B, in a case where the feature point is detected from the diagonal in a direction ①, if a plurality of pixels contact the diagonal as shown, a pixel (pixel ⓐ of the drawing) lastly detected is determined as the feature point. Next, the step is performed in directions ②, ③, and ④, and thereby desired feature points of the code image region are detected. Meanwhile, in a case where the feature points are detected by the diagonal detection method, all of the desired feature points may be not detected. For example, in the case of a quadrangular code image, four feature points should be extracted but only three feature points can be extracted. In FIG. 12C, in a case where the number of the feature points are not enough, the step of searching in vertical and horizontal directions is further performed. In other words, the pixels of the code image region nearest to the boundary surface of the candidate region are detected in directions ⑤, ⑥, ⑦, and ⑧. The feature points determined through the diagonal search method may be different from the feature points determined through search in vertical/horizontal directions. In such a case, either the averaged value of two coordinates or one of the two coordinates is selected to determine the feature point.

Figure 13A:
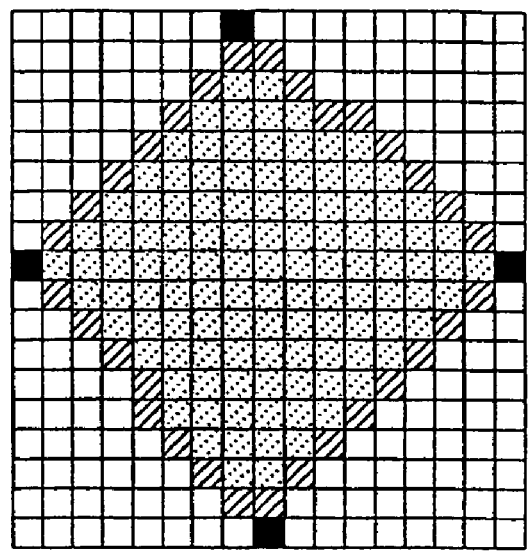
Figure 13B:
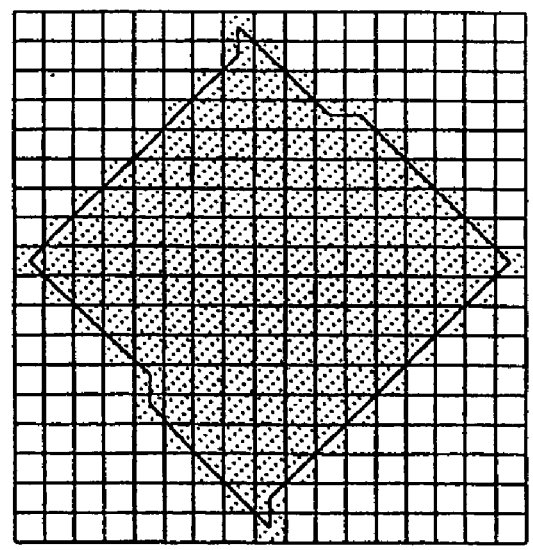

In view of the boundary detection method (see FIG. 13), the external boundary of the code image region included in the candidate region is tracked, and thus the feature points, such as vertices of the code image, are searched. First, coordinates composing a boundary are chosen as candidate coordinates. Next, in a case where the slope of adjacent candidate coordinates is checked and there is no variation in the slope between the coordinates, a method for removing the coordinates from the candidate coordinates (slope-based method) is used. For example, in a case where adjacent candidate coordinates are $(x_{i-1}, y_{i-1})$, $(x_i, y_i)$, and $(x_{i+1}, y_{i+1})$, if $a_1=(y_i-y_{i-1})/(x_1-x_{i-1})$ and $a_2=(y_{i+1}-y_i)/(x_{i+1}-x_i)$, and $a_1$ is the same as $a_2$, or a difference between $a_1$ and $a_2$ is smaller than a predetermined value, the coordinate $(x_i, y_i)$ is not determined as the feature point.

In addition, a distance-based method besides the slope-based method may be adopted. In a case where a distance between the adjacent feature point candidate coordinates is smaller than a predetermined distance, the coordinates are removed from the feature point candidate coordinates. That is, in a case where a distance $|= \sqrt{(x_i-x_{i-1})^2+(y_i-y_{i-1})^2}|$ between the two adjacent candidate coordinates $(x_{i-1}, y_{i-1})$ and $(x_i, y_i)$ is smaller than the predetermined value, the coordinate $(x_i, y_i)$ is removed from the candidate coordinates.

Closing of the boundary and the angle and length of the boundary are checked using the feature points, and thus the shape and type of the code image can be searched. As an example, in a case where one code image may be formed of 5×5 or 8×5 cells, the types of the code image may be discriminated according to the ratio of width to length. That is, in a case where the ratio of width to length is similar, the code image may be determined as a square and may be recognized as a 5×5 matrix code image. On the other hand, in a case where a difference between the width and length is more than a predetermined value, the code image may be determined as a 8×5 two-dimensional code image. In addition, the center point of the cells composing the code image may be found using a length rate and slope. In addition, it is determined whether the code image is properly extracted in consideration of the size or area, and length rate of the code image.

Figure 14A:
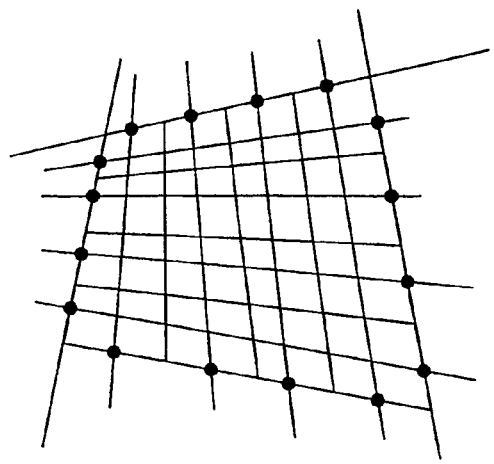
Figure 14B:
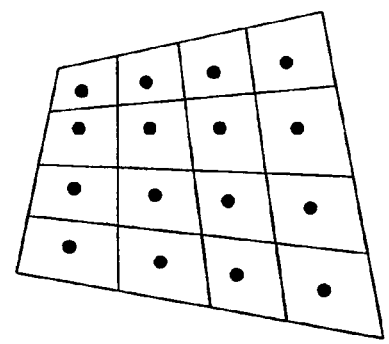
Figure 14C:
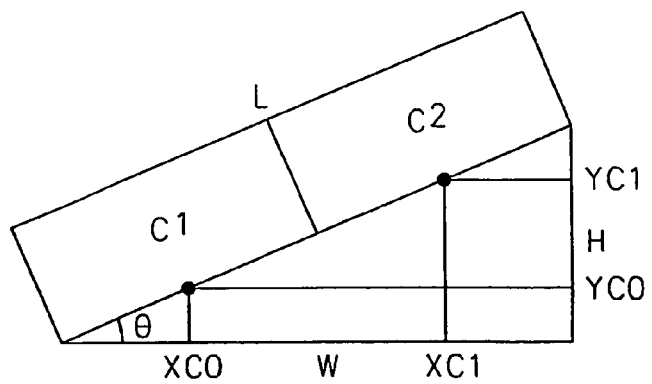

FIGS. 14A through 14C illustrate the step of dividing cells belonging to the code image region and finding center points of the cells. Referring to FIG. 14A, the code image in the present invention is determined as a 4×4 quadrangular image. The width and the length of the code image are divided by 4, respectively, and the coordinates of the center points of the cells divided as shown in FIG. 14B are obtained.

FIG. 14C illustrates an algorithm for searching for the center points of cells. In a case where the length of one side of the code image is L, and the length of an axis X is W, and the length of an axis Y is H when a perpendicular line is drawn toward the axes X and Y on the basis of the length L of the side of the code image, the position of $X_{ci}$ and $Y_{ci}$ used for searching for the center of an i-th cell contacting the side is expressed by Equation 6. Here, C is the number of cells positioned in rows or columns of a color code.

$$W = L \times \cos\theta \tag{6}$$
$$X_{Ci} = \frac{2t+1}{2C} \times W, t = 0, 1, \ldots, C-1, i = 1, 2, \ldots, C$$
$$H = L \times \sin\theta$$
$$Y_{Ci} = \frac{2t+1}{2C} \times H, t = 0, 1, \ldots, C-1, i = 1, 2, \ldots, C$$

The coordinate of the point contacting the side of the code is obtained by Equation 6, and in a case where the coordinate is connected to the point of the same order as that in an opposite side, the point of contact in which two segments are intersected is generated, which is determined as the center point of each cell. Equation 6 is ideal only for a case where a close-up photographing angle of the code image and a camera is 90 degree. Thus, in a case where the close-up angle is small (i.e., in a case where the camera is lying down), distortion occurs in the code image, and thus errors may be generated. For example, in a case where the close-up angle is excessively small, the code image of the original quadrangle is input in the form of trapezoid. Thus, in order to correct this, an extra arithmetic operation may be required but in most cases, the above Equation is enough. In particular, although distortion is severe, if the size of the image is large, the center position of cells may be searched for using the above Equation or an auxiliary Equation. Besides the above method, the boundary line, or the boundary region between cells, which is inserted when the code image is generated, is detected in consideration of the distribution of colors of pixels in the code image region, and thus cells may be discriminated on this basis.

In step 68, the decoder 57 decodes the code image by using data searched from the feature point-extracting portion 56 and reproduces code data. The steps of determining the color/shade of each cell and of checking parity data are performed using the color environmental variable and the analysis information (color mode and the type of code image) input by the controller 58. The value of the color or shade detected for each cell is replaced with a corresponding character, number, or symbol. Then abnormality can be determined through a parity operation, and the corresponding character, number, or symbol is output in a case where there is no abnormality. The above steps are performed on all of the cells, and desired code data are generated by connecting the character, number, or symbol obtained with respect to each cell.

The position of each cell is checked by the center coordinate of each cell input from the feature point-extracting portion 56, and a predetermined number of pixels are extracted on this basis, and thus colors can be determined. Colors can be determined using the RGB mode after the averaged value of sampled pixels is obtained, or colors can be determined to represent a corresponding cell after the angle of colors is obtained using the HSV mode. In the case of color determination using the RGB mode, the value for each of the RGB components of the sampled pixels in the color image is 0 or 255 after undergoing the step of converting colors by the color environmental variable, and thus the colors are in a standard color state. Thus, the color having the most frequency among the sampled pixels is determined as the color of a corresponding cell. In a case where the color image which has not been converted into the standard colors, are input, the color environmental variable is applied to the sampled pixels, and the sampled pixels are converted into the standard colors, and colors having the most frequency are determined as colors of a corresponding cell. In the case of color determination by the HSV mode, the values of RGB of the sampled pixels are determined after being converted through HSV conversion.

In the case of the code image represented as a three-grey level, the averaged values of each of cells are obtained, and in a case where the averaged values are aligned in the order of size, portions having the relatively high frequency of distribution of the aligned averaged values are converged into three places, and also there are intervals among the three places, which have relatively low frequency. The center point of the longest interval and the center point of the longest interval in the second place are obtained, and then if values corresponding to the two center points are compared with the averaged values of each of cells, it can be determined whether each cell belongs to which level (one among black, grey, and white). For example, the averaged values of values for R, G, and B of the pixels sampled from a cell are obtained, and thereby may be used as the brightness value. The distribution of the brightness value is checked using the brightness values obtained for each cell, and is divided into three groups such as black, white, and grey. Then, a shade of a cell is determined as shade nearest to the brightness value of the cell.

In the case of the code image shown in FIG. 2E, the data region is discriminated from the auxiliary regions (the parity region, the reference region and/or the control region) in the code image. In a case where there is the reference region, the colors, shade, shapes, and patterns, which are represented in each cell, are determined using the reference region, and in a case where there is the parity region, errors of data cells are determined.

The step of searching shapes, colors, patterns, and characters, which are included in the code image, is required in the step of decoding, and besides this, the step of correcting a distorted image. Here, color determination is possible using one or more methods among the red, green, and blue (RGB) mode, the hue, saturation, and value (HSV) mode, the cyan, magenta, and yellow (CMY) mode, and the hue, lightness, and saturation (HLS) mode.

The code values of each of cells positioned in the data region and/or the auxiliary region are extracted for decoding. In a case where there is the reference region, reference colors (or shade), reference shapes or reference patterns as a reference for interpreting data in all regions are made by detecting colors or shade of a reference cell. The colors, shapes, and patterns of the cells positioned in the data region, the parity region or the control region are detected, and then a difference between the detected one and the reference colors, the reference shapes and/or the reference patterns is obtained, and thereby the difference is converted into the code values for each of the cells. In a case where there is no reference region, the code values corresponding to each of the cells may be obtained according to the colors or shade, shapes and/or patterns, which are read by the image input device.

In a case where there is the parity region, the step of checking errors of the parity with respect to each row and column of the code image by the code values (that is, parity data) obtained from the parity region is performed. Environmental variables optimized to illumination usually used, and weight values thereof may be preset to store in a decoding program or database such that the user,can select the environmental variable most suitable for own environment. The occurrence of the parity errors can be considered that there are errors in reading colors by the environmental variables presently set, and in this case, another environmental variable is adopted to read colors again. If necessary, the direction or position of the code image may be searched based on the parity data.

The code values of each of the cells obtained by the above step are converted into code data comprised of recognizable characters including numbers and symbols by the code conversion table (see FIG. 3B). In a case where there are the control region for setting matters related to commands or services, which are available using code data, in the code image, the commands or services are provided according to the data set in the control region, and if not, basic services designated in a program may be provided.

Figure 15:
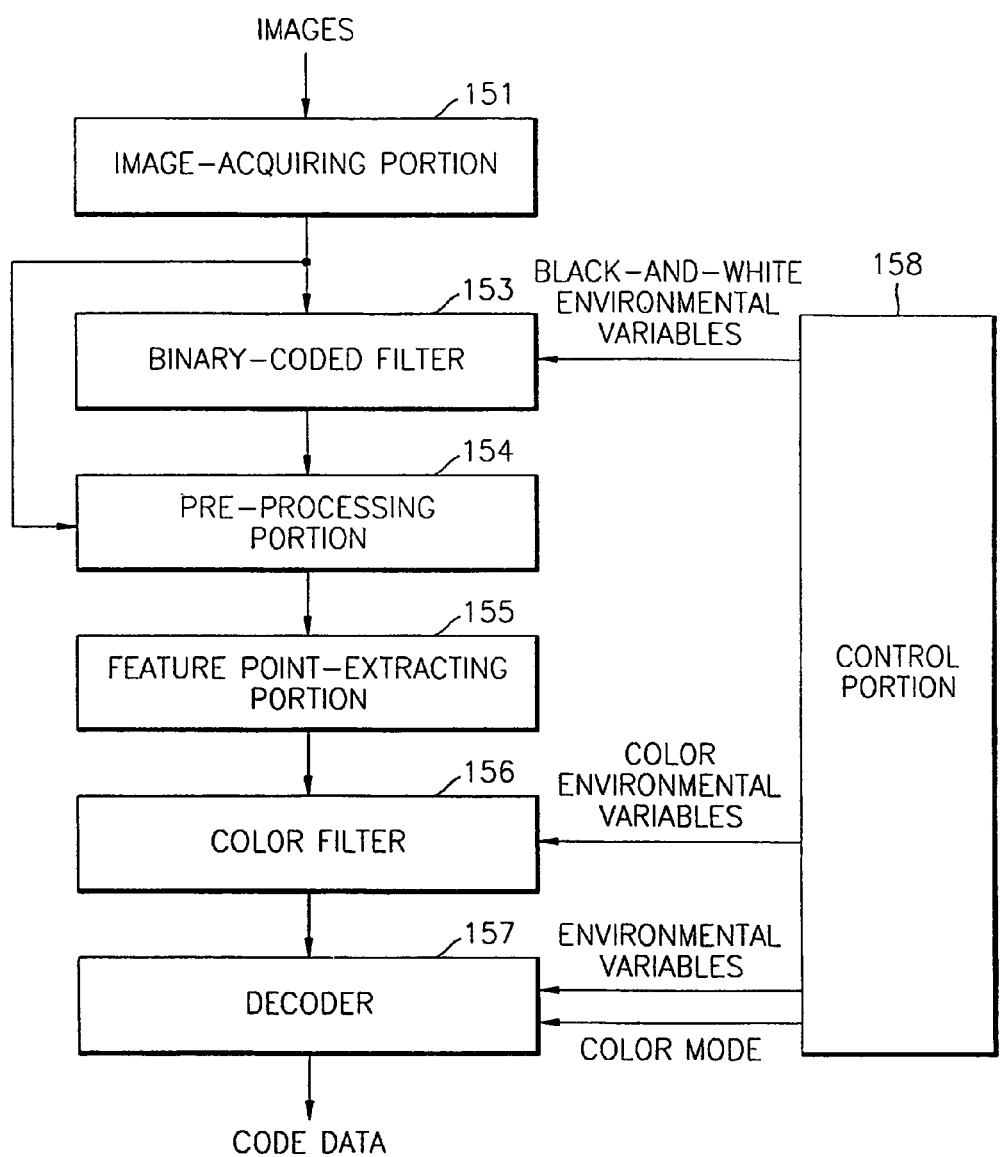
FIG. 15 is a block diagram of the apparatus according to a third embodiment of the present invention.
Figure 16:
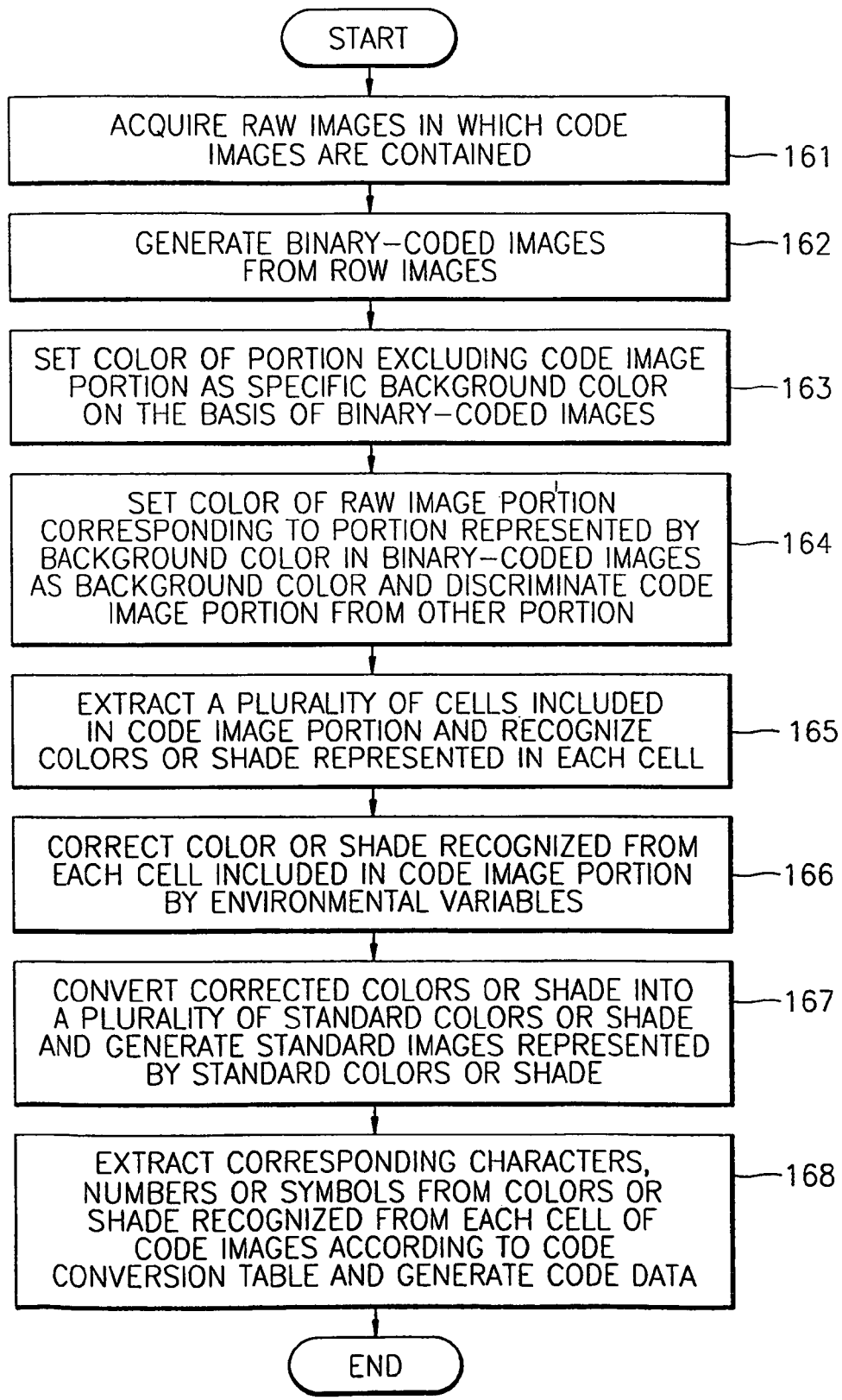
FIG. 16 is a flow chart illustrating the operation of the apparatus shown in FIG. 15.

FIG. 15 is a block diagram of the apparatus according to a third embodiment of the present invention, and FIG. 16 is a flow chart illustrating the operation of the apparatus shown in FIG. 15. Compared with the apparatus shown in FIG. 5, there is a difference in which the apparatus of FIG. 5 previously converts colors of each pixel with respect to the raw image into standard colors by means of a color filter and performs image processing, and the apparatus of FIG. 15 extracts the desired code image region from the raw image and converts colors of each of pixels (or a pixel sampled among pixels) belonging to the code image region into the standard colors using the environmental variables by means of the color filter. Other functions or operation are basically similar, and a memory is not shown as a matter of convenience. Hereinafter, a difference from the apparatus of FIG. 5 will be described, and the other may be same applied only if there is no problem with the processing order or operation.

The apparatus for recognizing a code shown in FIG. 15 acquires the raw image in which the code image is included, in an image-acquiring portion 151, divides colors or shade of the raw image into two colors according to a predetermined reference value in a binary-coded conversion portion 153, thereby generating a binary-coded image.

A pre-processing portion 154 sets a color of a portion excluding a code image portion in the binary-coded image as a specific background color, sets a color of a portion of the raw image corresponding to the portion set by the background color in the binary-coded image, as the background color, thereby discriminating the code image portion from other portions. A feature point-extracting portion 155 extracts a plurality of cells included in the code image portion and recognizes colors or shade represented in each cell.

A color filter 156 sets environmental variables in consideration of an environment at a time when the raw image is acquired, corrects the colors or shade recognized in each cell included in the code image portion by the environmental variables, converts the corrected colors or shade into a plurality of standard colors or standard shade used to generate the code image, thereby generating a standard image represented by the standard colors or standard shade.

A decoder 157 extracts a corresponding character, number, or symbol from colors or shade recognized in each cell of the code image according to a relationship between a character, number, or symbol and corresponding colors or shade, and generate code data.

The operation of the apparatus shown in FIG. 15 will be described with reference to FIG. 16. In step 161, the raw image in which the code image is contained, are acquired. In step 162, the colors or shade of the raw image is divided into two colors according to the predetermined reference value, and thus the binary-coded image is generated. In step 163, the portion excluding the code image portion is represented by the specific background color on the basis of the binary-coded image. In step 164, the portion of the raw image corresponding to the portion represented by the background color in the binary-coded image is processed as the background color, thereby discriminating the code image portion from the other portions. In step 165, the plurality of cells included in the code image portion are extracted, and then colors or shade represented in each cell are recognized. In step 166, the environmental variables are set in consideration of the environment at a time when the raw image is acquired, and the colors or shade recognized in each cell included in the code image is corrected by the environmental variables. In step 167, the corrected colors or shade are converted into a plurality of standard colors or standard shade, which are used to generate the code image, and thus the standard image represented by the standard colors or standard shade is generated. In the present embodiment, since the position of the center point of each cell and the type of a code are already known, predetermined pixels are sampled on the basis of the center point of each cell, and the environmental variables are applied only to the sampled pixels, and thereby the standard colors or standard shade of the cell may be discriminated. Preferably, data related to the discriminated standard colors or standard shade of each cell are stored in a memory and are used to generate code data. As a result, steps required to generate the standard image may be omitted.

In step 168, a corresponding character, number, or symbol is extracted from the colors or shade recognized in each cell of the code image according to the relationship between a character, number, or symbol and corresponding colors or shade, and thus code data are generated.

The method for recognizing a code according to the present invention can be embodied in a computer program. The program can be realized in media used in a computer and in a common digital computer for operating the program. The program can be stored in computer readable media. The media can include magnetic media such as a floppy disk or a hard disk and optical media such as a CD-ROM or a digital video disc (DVD). Also, the program can be transmitted by carrier waves such as Internet. Also, the computer readable media is dispersed into a computer system connected by networks and can be stored as computer readable codes and implemented by a dispersion method.

Industrial Applicability

As described above, the apparatus for recognizing a code and the method therefore according to the present invention can receive a code image in which predetermined data are encoded by colors or shade, precisely discriminate original colors or shade regardless of an environment into which the code image is input, and thus desired code data can be obtained.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for recognizing a code, the apparatus comprising:
an image-acquiring portion for acquiring a raw image in which a code image is contained;
a color-converting portion for correcting colors or shades recognized in the raw image, using an environmental variable which is set to discriminate colors or shades of the raw image in consideration of an environment in which the raw image is input, converting the corrected colors or shades into a plurality of standard colors or standard shades used to generate the code image, and generating a standard image represented by the standard colors or standard shades;
a binary-coding converting portion for dividing the colors or shades of the raw image into two colors according to a predetermined reference value and generating a binary-coded image;
an image-processing portion for extracting an area excluding a code image area from the binary-coded image, setting a color of the area corresponding to the extracted area in the standard image as a background color, thereby discriminating the code image area from other areas, extracting a plurality of cells included in the code image area, and recognizing the standard color or standard shade represented in each of the cells; and
a code-converting portion for extracting a corresponding character, number, or symbol from the color or shade recognized in each of the cells of the code image according to a relationship between a character, number, or symbol and a corresponding color or shade and generating code data.

2. The apparatus of claim 1, wherein the predetermined reference value of the binary-coding converting portion is set to the averaged value of values for R, G, and B of a red green blue (RGB) color mode, or a minimum value or maximum value among them, a value for V of a hue saturation value (HSV) color mode, a value for I of a hue saturation intensity (HSI) color mode, or a value for K of a cyan magenta yellow black (CMYK) color mode.

3. The apparatus of claim 1, wherein the image-processing portion sets colors of pixels positioned at an edge of the binary-coded image as a background color, and sets colors of pixels connected to the pixels set by the background color as the background color, thereby discriminating the code image area from other areas.

4. The apparatus of claim 1, wherein the image-processing portion receives an image in which the code image area and the other areas are divided into one another by the background color, divides the image into a plurality of blocks, detects a region having a color or shade that is not the background color, from each of the blocks, selects a block having the largest region among the plurality of blocks, detects a center point of the code image area contained in the block, and searches the entire image on the basis of the center point, thereby detecting the region having a color or shade that is not the background color as the code image area.

5. The apparatus of claim 1, wherein the code-converting portion recognizes a color or shade having the greatest distribution among the colors or shades of pixels belonging to each cell, as the color or shade of a corresponding cell.

6. An apparatus for recognizing a code, the apparatus comprising:
an image-acquiring portion for acquiring a raw image in which a code image is contained;
a binary-coding converting portion for dividing the colors or shades of the raw image into two colors according to a predetermined reference value and generating a binary-coded image;
an image-processing portion for extracting an area excluding a code image area from the binary-coded image, setting a color of the area corresponding to the extracted area in the standard image as a background color, thereby discriminating the code image area from other areas, extracting a plurality of cells included in the code image area, and recognizing the standard color or standard shade represented in each of the cells;
a color-converting portion for correcting colors or shades recognized with respect to each of the cells included in the code image area, using an environmental variable which is set to discriminate colors or shades of the raw image in consideration of an environment in which the raw image is input, and converting the corrected colors or shades into a plurality of standard colors or standard shades used to generate the code image; and
a code-converting portion for extracting a corresponding character, number, or symbol from the color or shade recognized in each of the cells of the code image according to a relationship between the character, number, or symbol and the corresponding color or shade and generating code data.

7. The apparatus of claim 6, wherein the image-processing portion sets colors of pixels positioned at an edge of the binary-coded image as a background color, and sets colors of pixels connected to the pixels set by the background color as the background color, thereby discriminating the code image area from other areas.

8. The apparatus of claim 6, wherein the image-processing portion receives an image in which the code image area and the other areas are divided into one another by the background color, divides the image into a plurality of blocks, detects a region having a color or shade that is not the background color, from each of the blocks, selects a block having the largest region among the blocks, detects a center point of the code image area contained in the block, and searches the entire image on the basis of the center point, thereby detecting the region having a color or shade that is not the background color as the code image area.

9. A method for recognizing a code, the method comprising the steps of:
acquiring a raw image in which a code image is contained;
correcting colors or shades recognized from the raw image, using an environmental variable which is set to discriminate colors or shades of the raw image in consideration of an environment in which the raw image is input;
converting the corrected colors or shades into a plurality of standard colors or standard shades used to generate the code image, and generating a standard image represented by the standard colors or standard shades;
dividing the colors or shades of the raw image into two colors according to a predetermined reference value and generating a binary-coded image;

extracting an area excluding a code image area from the binary-coded image, and setting a color of the area corresponding to the extracted area in the standard images as a background color, thereby discriminating the code image area from other areas;

extracting a plurality of cells included in the code image area, and recognizing the standard color or standard shade represented in each of the cells; and extracting a corresponding character, number, or symbol from the color or shade recognized in each of the cells of the code image according to a relationship between the character, number, or symbol and the corresponding color or shade and generating code data.

10. A computer readable media for implementing the method of claim 9.

11. A method for recognizing a code, the method comprising the steps of:

acquiring a raw image in which a code image is contained;

dividing the colors or shades of the raw image into two colors according to a predetermined reference value and generating a binary-coded image;

extracting an area excluding a code image area from the binary-coded image, and setting a color of the area corresponding to the extracted area in the standard image as a background color, thereby discriminating the code image area from other areas;

extracting a plurality of cells included in the code image portion, and recognizing the standard color or standard shade represented in each of the cells;

correcting colors or shades recognized from the raw image with respect to each of the cells included in the code image area, using an environmental variable which is set to discriminate colors or shades of the raw image in consideration of an environment in which the raw image is input;

converting the corrected colors or shades into a plurality of standard colors or standard shades used to generate the code image; and extracting a corresponding character, number, or symbol from the color or shade recognized in each of the cells of the code image according to a relationship between the character, number, or symbol and the corresponding color or shade and generating code data.

12. A computer readable media for implementing the method of claim 11.

13. An apparatus for recognizing a code, the apparatus comprising:

an image-acquiring portion for acquiring a raw image in which a code image is contained;

an image-processing portion for extracting the code image from the raw image and recognizing colors or shades represented in a plurality of cells included in the code image, setting an environmental variable in consideration of an environment at a time where the raw image is acquired, and correcting the colors or shades recognized in the raw image using the environmental variable;

a code-setting portion in which a relationship between a character, number, or symbol and a corresponding color or shade is set; and a code-converting portion for extracting the corresponding character, number, or symbol from the color or shade represented in each of the cells of the code image according to the relationship set in the code-setting portion and generating code data.

14. The apparatus of claim 13, wherein the image-processing portion extracts a code image region, in which a background image portion is excluded, from the raw image, discriminates the shape and type of the code image, and discriminates cells included in the code image region on this basis.

15. The apparatus of claim 13, wherein the image-processing portion converts the raw image into a binary-coded image on the basis of the environmental variables, which are set according to the degree of brightness in a state where the raw image is input, extracts the background image area from the binary-coded image, sets a color of the area corresponding to the extracted area in the raw image as a background color, thereby discriminating a code image area from other areas and extracts the code image region from the raw image.

* * * * *